US010713431B2

(12) United States Patent
Ghatage et al.

(10) Patent No.: US 10,713,431 B2
(45) Date of Patent: Jul. 14, 2020

(54) DIGITAL DOCUMENT PROCESSING BASED ON DOCUMENT SOURCE OR DOCUMENT TYPE

(71) Applicant: Accenture Global Solutions Limited, Dublin (IE)

(72) Inventors: Prakash Ghatage, Bangalore (IN); Tomas Chaloupka, Prague (CZ); Pavel Sem, Prague (CZ); Harsh Kumar Katiyar, Bangalore (IN); Nirav Sampat, Mumbai (IN); Kumar Viswanathan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 517 days.

(21) Appl. No.: 15/373,205

(22) Filed: Dec. 8, 2016

(65) Prior Publication Data
US 2017/0192940 A1     Jul. 6, 2017

(30) Foreign Application Priority Data
Dec. 29, 2015   (IN) ........................... 7017/CHE/2015

(51) Int. Cl.
    *G06F 16/93*     (2019.01)
    *G06F 40/194*     (2020.01)
    (Continued)

(52) U.S. Cl.
    CPC .......... *G06F 40/194* (2020.01); *G06F 16/93* (2019.01); *G06F 40/123* (2020.01); *G06F 40/14* (2020.01); *G06F 40/186* (2020.01)

(58) Field of Classification Search
    CPC ............ G06F 17/2211; G06F 17/2205; G06F 17/2247; G06F 17/248; G06F 17/30011;
    (Continued)

(56) References Cited

U.S. PATENT DOCUMENTS 6,069,624 A * 5/2000 Dash ...................... B41J 2/1752
    358/1.15
6,587,126 B1 * 7/2003 Wakai ................... G06F 3/1296
    358/1.13

(Continued)

FOREIGN PATENT DOCUMENTS

PH     1/2013/000079     3/2016

*Primary Examiner* — Thu V Huynh
(74) *Attorney, Agent, or Firm* — Harrity & Harrity, LLP

(57) ABSTRACT

A method may include receiving, from multiple, different sources, documents. The documents may be received in multiple, different file formats. The method may include performing operations on the documents to prepare the documents for processing, to obtain data included in the documents, or to determine information describing the documents. The method may include storing or providing, for storage, status information corresponding to the documents. The status information for a document may identify results of performing the operations with regard to the document. The method may include receiving an instruction that identifies an action to perform with regard to the document. The method may include performing the action. The method may include updating the status information to generate updated status information based on a result of performing the action. The method may include providing the updated status information.

20 Claims, 11 Drawing Sheets

(51) Int. Cl.
*G06F 40/14* (2020.01)
*G06F 40/123* (2020.01)
*G06F 40/186* (2020.01)

(58) Field of Classification Search
CPC ...... G06F 16/93; G06F 40/194; G06F 40/123; G06F 40/186; G06F 40/14
See application file for complete search history.

(56) References Cited

U.S. PATENT DOCUMENTS

| | | | | |
|---|---|---|---|---|
| 6,667,810 | B1* | 12/2003 | Jeyachandran | G06F 3/1204 358/1.14 |
| 8,115,940 | B2* | 2/2012 | Utsunomiya | H04N 1/00411 358/1.13 |
| 8,140,468 | B2 | 3/2012 | Kwok et al. | |
| 2006/0059162 | A1* | 3/2006 | Rizk | G06F 17/30011 |
| 2006/0136513 | A1 | 6/2006 | Ngo et al. | |
| 2007/0154098 | A1* | 7/2007 | Geva | G06F 17/243 382/209 |
| 2007/0174486 | A1 | 7/2007 | Holstege | |
| 2008/0072290 | A1 | 3/2008 | Metzer et al. | |
| 2009/0027732 | A1* | 1/2009 | Imai | G06T 5/00 358/3.27 |
| 2010/0070500 | A1 | 3/2010 | Cui et al. | |
| 2010/0265531 | A1* | 10/2010 | Nitta | G06F 3/1222 358/1.14 |
| 2011/0258150 | A1 | 10/2011 | Neogi et al. | |
| 2013/0222827 | A1* | 8/2013 | Watanabe | G06F 3/122 358/1.13 |
| 2014/0164408 | A1 | 6/2014 | Dubbels | |
| 2014/0195891 | A1 | 7/2014 | Rao et al. | |
| 2014/0204423 | A1* | 7/2014 | Koutrika | G06F 3/1203 358/1.16 |
| 2014/0279393 | A1* | 9/2014 | Coomes | G06Q 40/025 705/38 |
| 2018/0096203 | A1* | 4/2018 | King | G06F 17/214 |
| 2019/0306341 | A1* | 10/2019 | Matysiak | H04N 1/00403 |

* cited by examiner

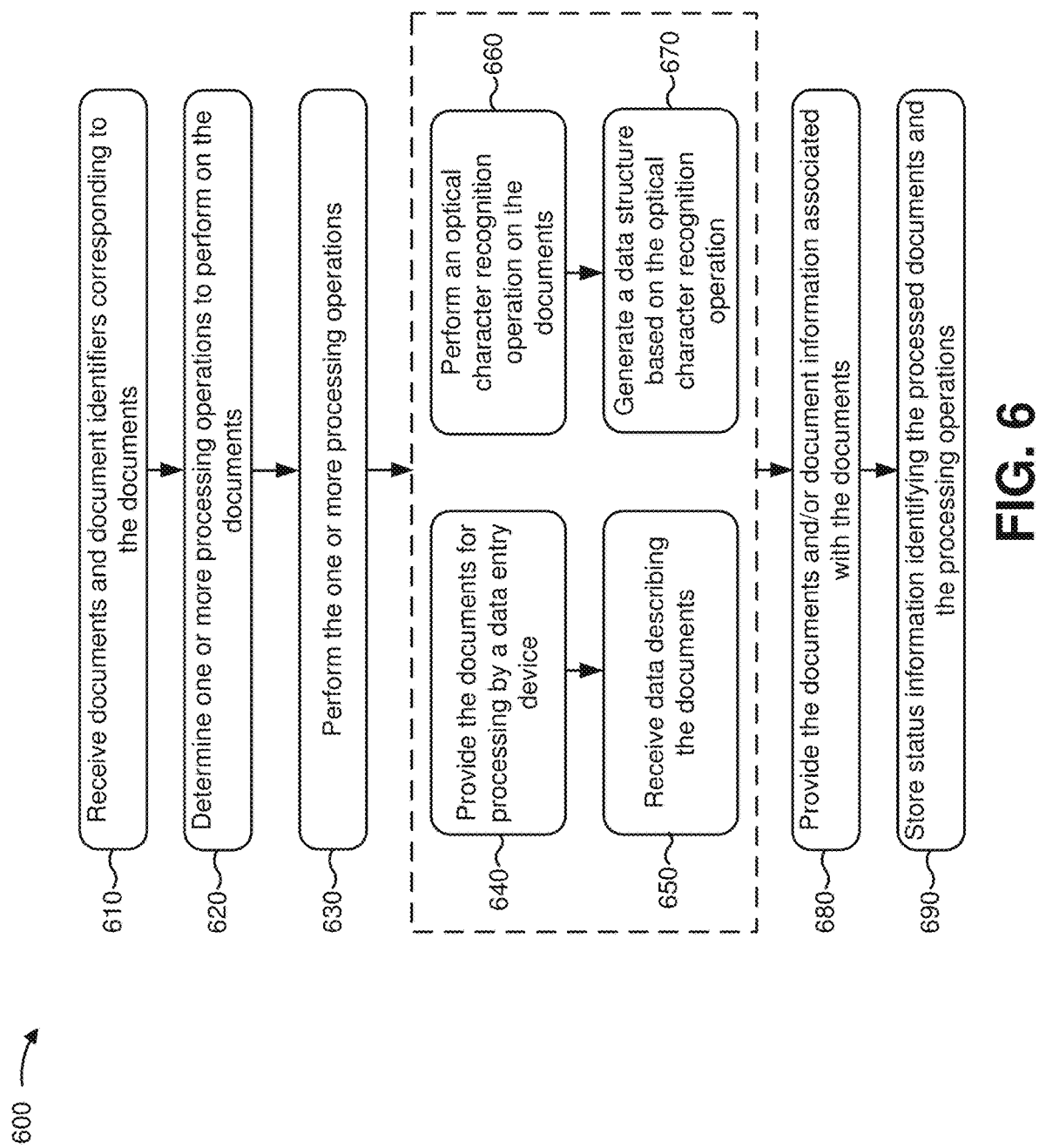

DIGITAL DOCUMENT PROCESSING BASED ON DOCUMENT SOURCE OR DOCUMENT TYPE

RELATED APPLICATION

This application claims priority under 3 U.S.C. § 119 to Indian Patent Application No. 7017/CHE/2015, filed on Dec. 29, 2015, the content of which is incorporated by reference herein in its entirety.

BACKGROUND

Documents may be produced for a variety of purposes and/or in a variety of file formats (e.g., .pdf, .docx, .xlsx, .txt, .dat, .jpg, .tiff, an unformatted file, etc.). The documents may include text or other content, and may be generated by a variety of parties (e.g., a person, a company, an automated process, etc.) using a variety of devices (e.g., a scanner, a computer, a user device, an imaging device, etc.).

SUMMARY

According to some possible implementations, a system may receive a set of documents. The system may receive the set of documents from multiple, different sources. The documents may be associated with multiple, different file formats. The system may perform one or more operations on the set of documents to prepare the set of documents for processing, to obtain data included in the set of documents, or to determine information describing the set of documents. At least one of the one or more operations may be selected based on the multiple, different sources or based on the multiple, different file formats. The system may store status information corresponding to the set of documents. The status information may identify results of performing the one or more operations. The system may receive an instruction pertaining to a document of the set of documents. The instruction may identify an action to perform with regard to the document. The system may perform the action based on the instruction. The system may update the status information, as updated status information, to identify the action or a result of performing the action. The system may provide the updated status information.

According to some possible implementations, the action may include obtaining particular data describing the document. The system, when performing the action may determine that a particular operation to obtain the particular data has not been performed on the document. The system may obtain the document. The system may perform the particular operation to obtain the particular data. The system may cause the particular data to be provided via a web application.

According to some possible implementations, the system may determine the one or more operations to perform based on a model. The model may receive attributes of the set of documents as input, and may output information identifying the one or more operations to perform.

According to some possible implementations, the one or more operations may include one or more of an operation to determine whether a source or a destination of one or more of the set of documents is valid, an operation to perform an antivirus scan on one or more of the set of documents, an operation to decompress one or more of the set of documents, or an operation to determine whether a file format of one or more the set of documents are valid.

According to some possible implementations, the system, when receiving the set of documents, may receive the set of documents via a secure session.

According to some possible implementations, the system, when performing the one or more operations may perform an optical character recognition operation to identify the data included in the set of documents. The system may generate a data structure based on the data included in the set of documents. The system may provide the data structure for storage in association with the set of documents.

According to some possible implementations, the system, when performing the one or more operations, may provide a particular document, of the set of documents, to another device. The other device may receive input identifying the information relating to the set of documents. The system may receive, from the other device, the information relating to the set of documents.

According to some possible implementations, a non-transitory computer-readable medium may store one or more instructions that, when executed by one or more processors, cause the one or more processors to receive a set of documents from multiple, different sources. The set of documents may be associated with multiple, different file formats. The one or more instructions, when executed by the one or more processors, may cause the one or more processors to perform one or more operations on the set of documents to prepare the set of documents for processing, to identify data included in the set of documents, or to identify information relating to the set of documents. At least one of the one or more operations may be selected based on the multiple, different sources or based on the multiple, different file formats. The one or more instructions, when executed by the one or more processors, may cause the one or more processors to store status information corresponding to the set of documents. The status information for a document, of the set of documents, may identify a result of performing the one or more operations with regard to the document. The one or more instructions, when executed by the one or more processors, may cause the one or more processors to receive an instruction pertaining to a particular document of the set of documents. The instruction may identify an action to perform with regard to the particular document. The one or more instructions, when executed by the one or more processors, may cause the one or more processors to perform the action based on the instruction. The one or more instructions, when executed by the one or more processors, may cause the one or more processors to update the status information, as updated status information, to identify the action or a result of performing the action. The one or more instructions, when executed by the one or more processors, may cause the one or more processors to provide the updated status information.

According to some possible implementations, the one or more instructions, that cause the one or more processors to perform the action, may cause the one or more processors to provide, for storage, the set of documents, the data included in the set of documents, or the information relating to the set of documents.

According to some possible implementations the action may relate to obtaining one or more documents of the set of documents. The one or more instructions, that cause the one or more processors to perform the action, may cause the one or more processors to obtain, from storage, the one or more documents. The one or more instructions, when executed by the one or more processors, may cause the one or more processors to obtain, from storage, data included in the one or more documents or information relating to the one or more documents. The one or more instructions, when executed by the one or more processors, may cause the one or more processors to provide the one or more documents, the data included in the one or more documents, or the information relating to the one or more documents.

According to some possible implementations, the one or more instructions, that cause the one or more processors to provide the updated status information, may cause the one or more processors to provide the updated status information via a web application interface.

According to some possible implementations, the action may relate to performing a particular operation that is different than the one or more operations. The one or more instructions, that cause the one or more processors to perform the action, may cause the one or more processors to determine that the particular operation has not yet been performed with regard to the particular document. The one or more instructions, when executed by the one or more processors, may cause the one or more processors to perform the particular operation based on determining that the particular operation has not yet been performed.

According to some possible implementations, an operation, of the one or more operations, may be an optical character recognition operation. The one or more instructions, that cause the one or more processors to receive the set of documents, may cause the one or more processors to receive information identifying a set of document templates corresponding to the set of documents. A document template, of the set of document templates, may identify one or more locations in a corresponding document at which to detect particular text. The one or more instructions, when executed by the one or more processors, may cause the one or more processors to perform the optical character recognition operation based on the set of document templates.

According to some possible implementations, the one or more instructions, that cause the one or more processors to receive the instruction, may cause the one or more processors to receive the instruction from a mobile device and based on an interaction with an interface of a web application. The one or more instructions, when executed by the one or more processors, may cause the one or more processors to provide information identifying a result of the action to the mobile device via the web application.

According to some possible implementations, a method may include receiving, by a device and from multiple, different sources, a set of documents. The set of documents may be received in multiple, different file formats. The method may include performing, by the device, one or more operations on the set of documents to prepare the set of documents for processing, to obtain data included in the set of documents, or to determine information describing the set of documents. At least one operation, of the one or more operations, may be selected based on the multiple, different sources or the multiple, different file formats. The method may include storing or providing for storage, by the device, status information corresponding to the set of documents. The status information for a document, of the set of documents, may identify results of performing the one or more operations with regard to the document. The method may include receiving, by the device, an instruction that identifies an action to perform with regard to the document of the set of documents. The method may include performing, by the device and based on the instruction, the action. The method may include updating, by the device, the status information to generate updated status information based on a result of performing the action. The method may include providing, by the device, the updated status information.

According to some possible implementations, the method may include generating a set of document identifiers corresponding to the set of documents. The method may include determining that the action relates to the document based on the instruction including a document identifier corresponding to the document, and performing the action with regard to the document.

According to some possible implementations, the action may include one or more of obtaining and providing one or more of the set of documents, performing an optical character recognition operation on one or more of the set of documents, changing the information describing one or more of the set of documents, changing the data obtained from one or more of the set of documents, storing additional information in association with one or more of the set of documents, changing a position in a queue of one or more of the set of documents, deleting one or more of the set of documents from storage, moving one or more of the set of documents from a first storage location to a second storage location, obtaining and providing the data, or obtaining and providing the information describing one or more of the set of documents.

According to some possible implementations, when receiving the set of documents, the method may include establishing, with another device, a secure session based on one or more credentials provided by the other device. The method may include receiving the set of documents via the secure session.

According to some possible implementations, when performing the one or more operations, the method may include determining whether a particular document, of the set of documents, is associated with a particular file format. The method may include selectively converting to the particular file format, or retaining in an unconverted state, the particular document, based on whether the particular document is associated with the particular file format. The particular document may be converted when the particular document is not associated with the particular file format. The particular document may be retained in the unconverted state when the particular document is associated with the particular file format.

According to some possible implementations the method may include storing the set of documents. The method may include receiving a request for a particular document of the set of documents. The method may include determining that data included in the particular document has not been obtained. The method may include obtaining the data included in the particular document. The method may include providing the particular document and the data included in the particular document.

BRIEF DESCRIPTION OF THE DRAWINGS

FIG. 6 is a flow chart of an example process for processing documents;

DETAILED DESCRIPTION

Figure 1:
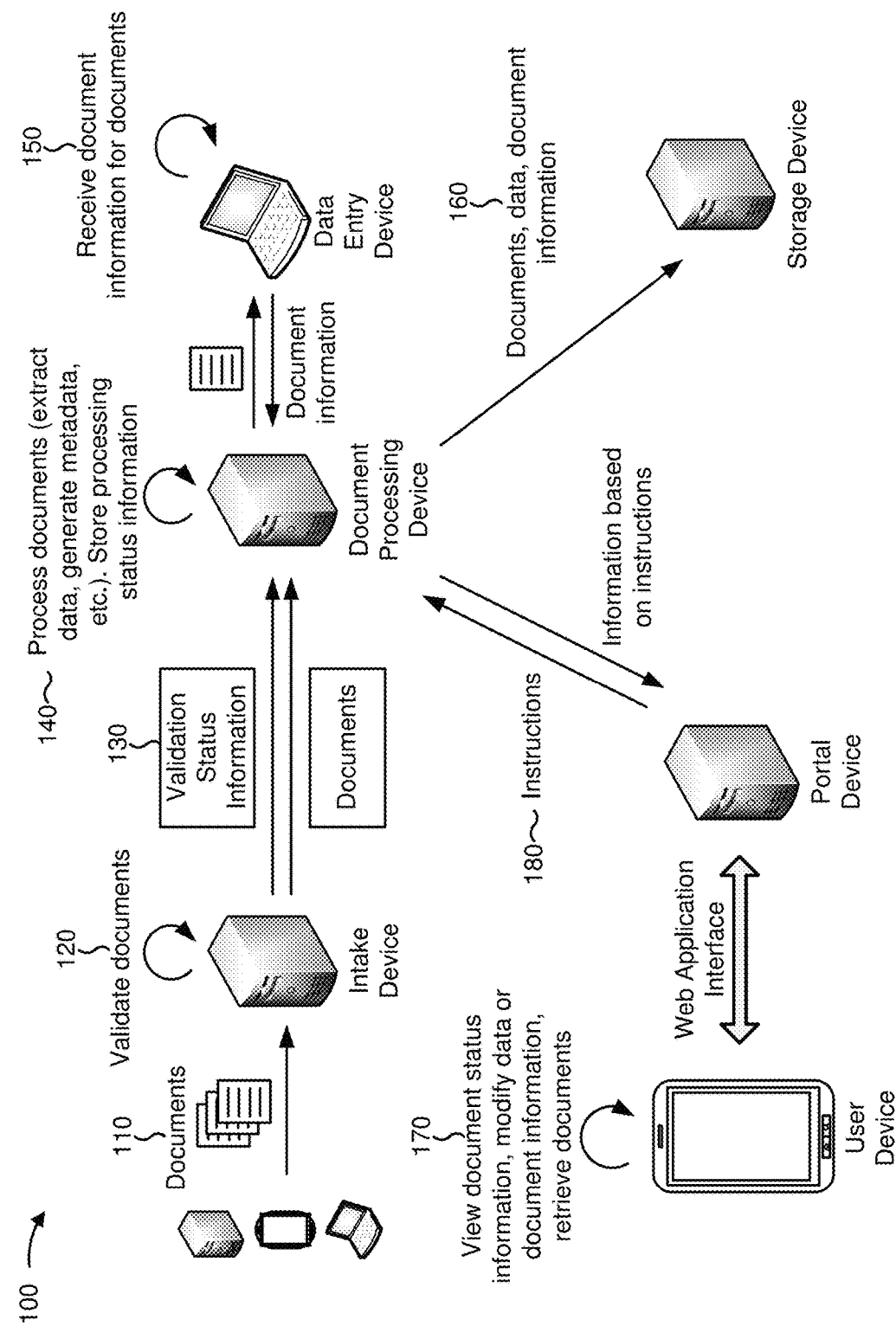
FIG. 1 is a diagram of an overview of an example implementation described herein.

The following detailed description of example implementations refers to the accompanying drawings. The same reference numbers in different drawings may identify the same or similar elements.

An entity may generate and/or use various documents in the course of operating. For example, the entity may generate and/or use invoices, accounts payable documents, receipts, documents related to an order-to-cash cycle, spreadsheets, emails, or the like. The documents may be generated by a variety of devices and/or processes (e.g., scanners, user devices, inputs to user devices, email, fax, etc.), and may be generated in a variety of file formats. The entity may track information associated with the documents using one or more devices.

However, the entity may expend significant resources tracking the information associated with the documents (e.g., organizational time and money, processor and storage resources of the one or more devices, time used to configure the one or more devices, etc.). For example, some documents may not be easily interpreted by a device (e.g., documents that do not include selectable text, documents that do not follow a particular document format, etc.), may be associated with multiple, different formats, may be afflicted with malware, may be too large for a device to handle efficiently, or the like. Further, the entity may need to compile documents from multiple, different sources, which may use processor resources and organizational time in configuring the one or more devices to obtain the documents from the multiple, different sources. Still further, the entity may not be able to quickly ascertain statuses of particular documents with regard to processing of the particular documents. For example, the entity may have difficulty determining whether useful information has yet been extracted from a document, whether a document has been processed before being stored by a storage device, or the like.

Implementations described herein describe a document processing system that can intake documents from a variety of sources in a variety of formats, which conserves organizational resources associated with configuring a system to handle the variety of sources and formats. Implementations described herein validate the documents to ensure that the documents are safe and usable, which improves security and reduces processor resources that are otherwise used to process invalid documents. Implementations described herein may process documents to extract information from the documents or to generate information describing the documents (e.g., using an optical character recognition operation, using input from data entry devices associated with a client entity and/or associated with the document processing system, etc.), which conserves processor and organizational resources that are otherwise used to manually re-enter the information.

Implementations described herein may also store status information identifying statuses of documents at different points in the validation, conversion, and/or processing process, which enables a user device associated with a client entity to determine a status of a document based on an interface with the document process (e.g., to determine whether the document has been processed, to audit the document processing system, etc.). In some cases, implementations described herein may include a portal device that provides a secure web application interface for obtaining information relating to the statuses and/or for causing the document processing system to perform actions. Thus, the document processing system conserves organizational time, money, and processing/storage resources by providing a secure, auditable system for processing and storing documents that is accessible via a web application interface.

FIG. 1 is a diagram of an overview of an example implementation 100 described herein. As shown in FIG. 1, and by reference number 110, a variety of devices may transmit documents to an intake device. The documents may include, for example, invoices, receipts, accounts receivable information, spreadsheets, balance sheets, a document related to an order-to-cash process, or any other type of textual and/or numerical document. In some cases, the intake device may be centralized (e.g., may be implemented in association with a document processing device, as described in more detail below). In other cases, the intake device may be located at and/or implemented by a client associated with the documents.

As shown by reference number 120, the intake device may validate the received documents. To validate the received documents, the intake device may perform a variety of validation operations based on, for example, a type of the documents and/or a source of the documents. For example, the intake device may determine whether sources or destinations of the documents are included in a blacklist, may perform antivirus scans on the documents, may decompress the documents (e.g., if the documents are received in a compressed state), may validate file extensions of the documents (e.g., determine whether file extensions of the documents match expected file extensions, match prohibited file extensions, etc.), or the like.

As shown by reference number 130, the intake device may provide validation status information to the document processing device. The validation status information may identify results of performing the one or more validation operations, may identify a position of a particular document in a queue, or the like. One or more devices (e.g., a user device, etc.) may access the validation status information to determine a status of one or more documents. As further shown, the intake device may provide documents (e.g., validated documents) to the document processing device. As shown by reference number 140, the document processing device may perform processing operations to process the documents (e.g., to extract data from the documents, to generate metadata describing the documents, etc.), and may track and/or store status information (e.g., validation status information, processing status information, etc.) identifying statuses of the documents.

As shown by reference number 150, in some cases, the document processing device may process a document by providing the document to a data entry device. The data entry device may receive input (e.g., from a party that generated the document, from a worker of a crowdsourcing crowd, from an employee of a company that uses the data entry device, etc.) identifying document information that describes the document. In this way, the document processing device improves accuracy of the document information. In some implementations, the document processing device may determine which documents to provide to the data entry device automatically (e.g., based on a format of a document, a source of a document, a result of a processing operation, etc.).

As shown by reference number 160, the document processing device may provide the documents, the data, the document information, and/or other information to a storage device for storage. In this way, the document processing device conserves storage resources of the document processing device.

As shown by reference number 170, a user device may provide, for display, document status information (e.g., validation status information, processing status information, etc.) obtained via a web application interface with a portal device. For example, the user device may obtain status information at any point during validation and/or processing of a particular document via the web application interface. In some implementations, the web application interface may require one or more credentials to access and/or may be provided via a secure session, which improves security of the portal device and/or the document processing device. As shown by reference number 180, based on interactions with the web application interface, the portal device may transmit instructions to the document processing device and may receive information based on the instructions.

Thus, the document processing system conserves organizational time, money, and processing/storage resources by providing a secure, auditable system for processing and storing documents that is accessible via a web application interface.

Figure 2:
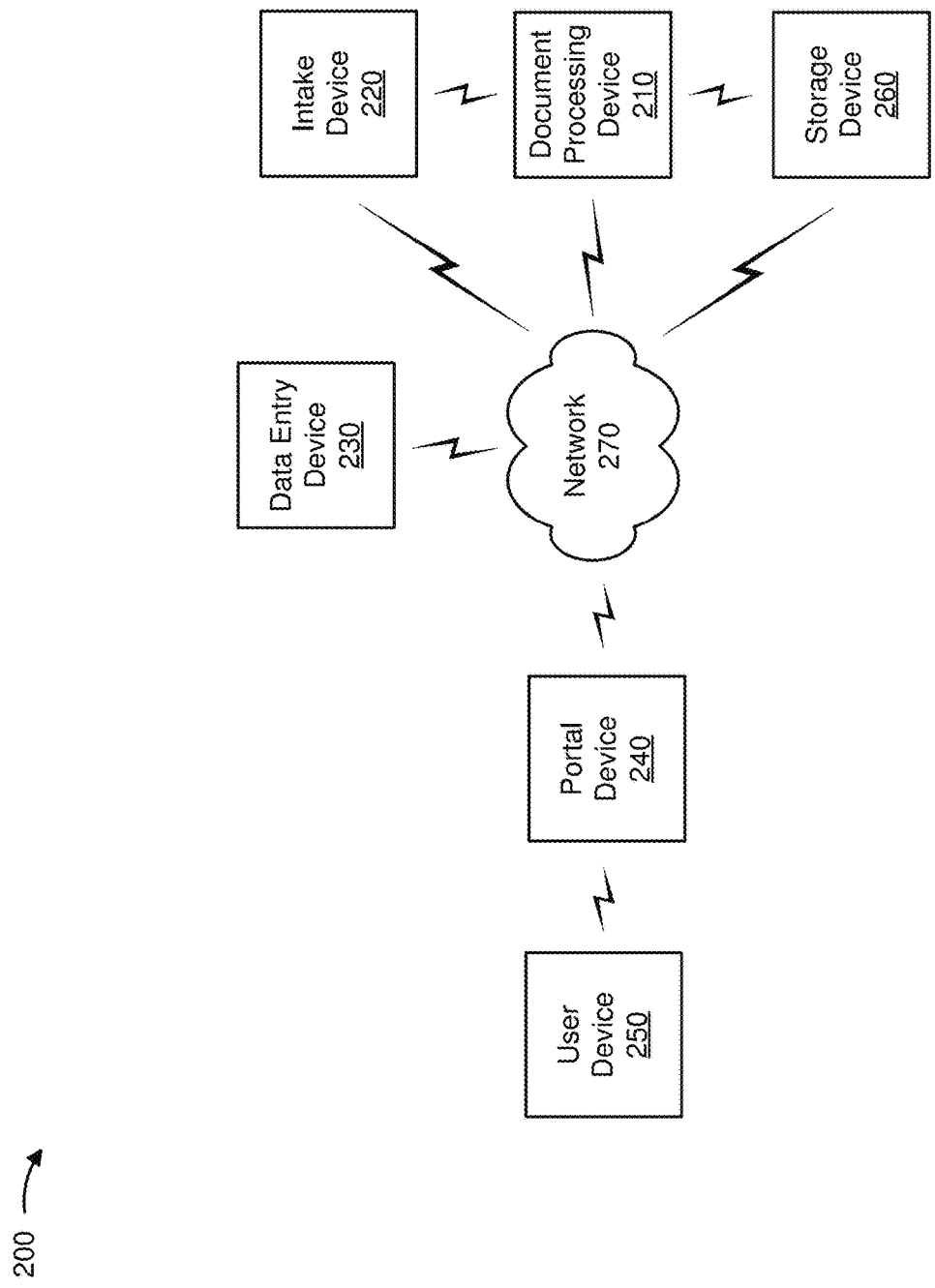
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a document processing device 210, an intake device 220, a data entry device 230, a portal device 240, a user device 250, a storage device 260, and a network 270. Devices of environment 200 may interconnect via wired connections, wireless connections, or a combination of wired and wireless connections.

Document processing device 210 may include one or more devices capable of receiving, generating, storing, processing, and/or providing information. For example, document processing device 210 may include a server device, a set of server devices, a resource in a cloud computing network, or the like. In some implementations, document processing device 210 may receive information from and/or provide information to another device in environment 200.

Intake device 220 may include one or more devices capable of receiving, generating, storing, processing, and/or providing information. For example, intake device 220 may include a server device, a set of server devices, a resource in a cloud computing network, or the like. In some implementations, intake device 220 may be associated with user device 250. For example, in some cases, user device 250 may perform actions described herein as being performed by intake device 220.

Data entry device 230 may include one or more devices capable of receiving, generating, storing, processing, and/or providing information. For example, data entry device 230 may include a communication and computing device, such as a mobile phone (e.g., a smart phone, a radiotelephone, etc.), a laptop computer, a tablet computer, a handheld computer, a desktop computer, or a similar type of device. In some implementations, data entry device 230 may receive information from and/or transmit information to another device in environment 200.

Portal device 240 may include one or more devices capable of receiving, generating, storing, processing, and/or providing information. For example, portal device 240 may include a server device, a set of server devices, a gateway, a router, a hub, or the like. In some implementations, portal device 240 may host a web application for accessing information associated with document processing device 210. In some implementations, portal device 240 may receive information from and/or transmit information to another device in environment 200.

User device 250 may include one or more devices capable of receiving, generating, storing, processing, and/or providing information. For example, user device 250 may include a communication and/or computing device, such as a mobile phone (e.g., a smart phone, a radiotelephone, etc.), a desktop computer a laptop computer, a tablet computer, a handheld computer, a gaming device, a wearable communication device (e.g., a smart wristwatch, a pair of smart eyeglasses, etc.), or a similar type of device. In some implementations, user device 250 may receive information from and/or transmit information to another device in environment 200.

Storage device 260 may include one or more devices capable of storing, processing, and/or routing information. For example, storage device 260 may include a server device, a set of server devices, or the like. In some implementations, storage device 260 may include a communication interface that allows storage device 260 to receive information from and/or transmit information to other devices in environment 200.

Network 270 may include one or more wired and/or wireless networks. For example, network 270 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
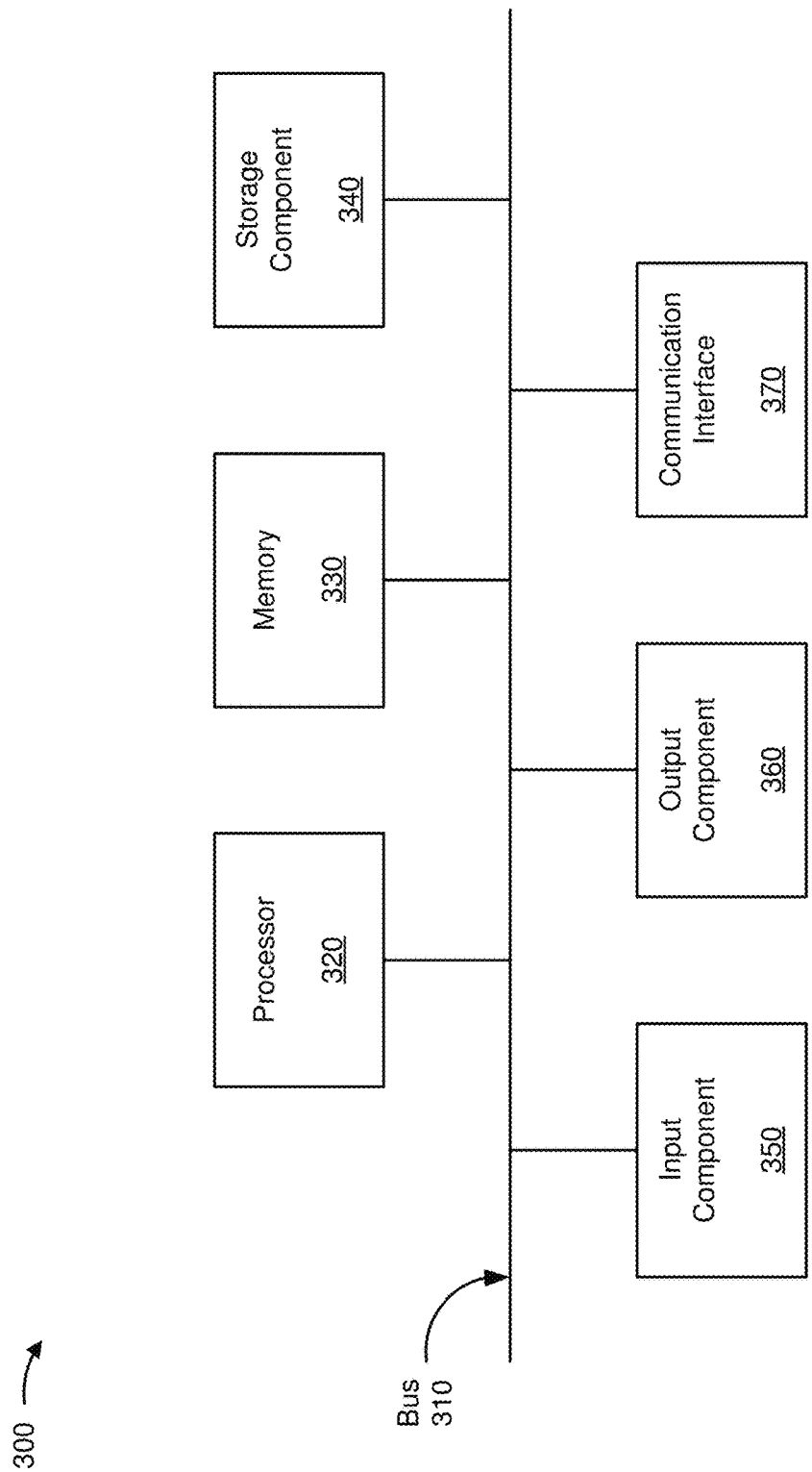
FIG. 3 is a diagram of example components of one or more devices of FIG. 2.

FIG. 3 is a diagram of example components of a device 300. Device 300 may correspond to document processing device 210, intake device 220, data entry device 230, portal device 240, user device 250, and/or storage device 260. In some implementations, document processing device 210, intake device 220, data entry device 230, portal device 240, user device 250, and/or storage device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
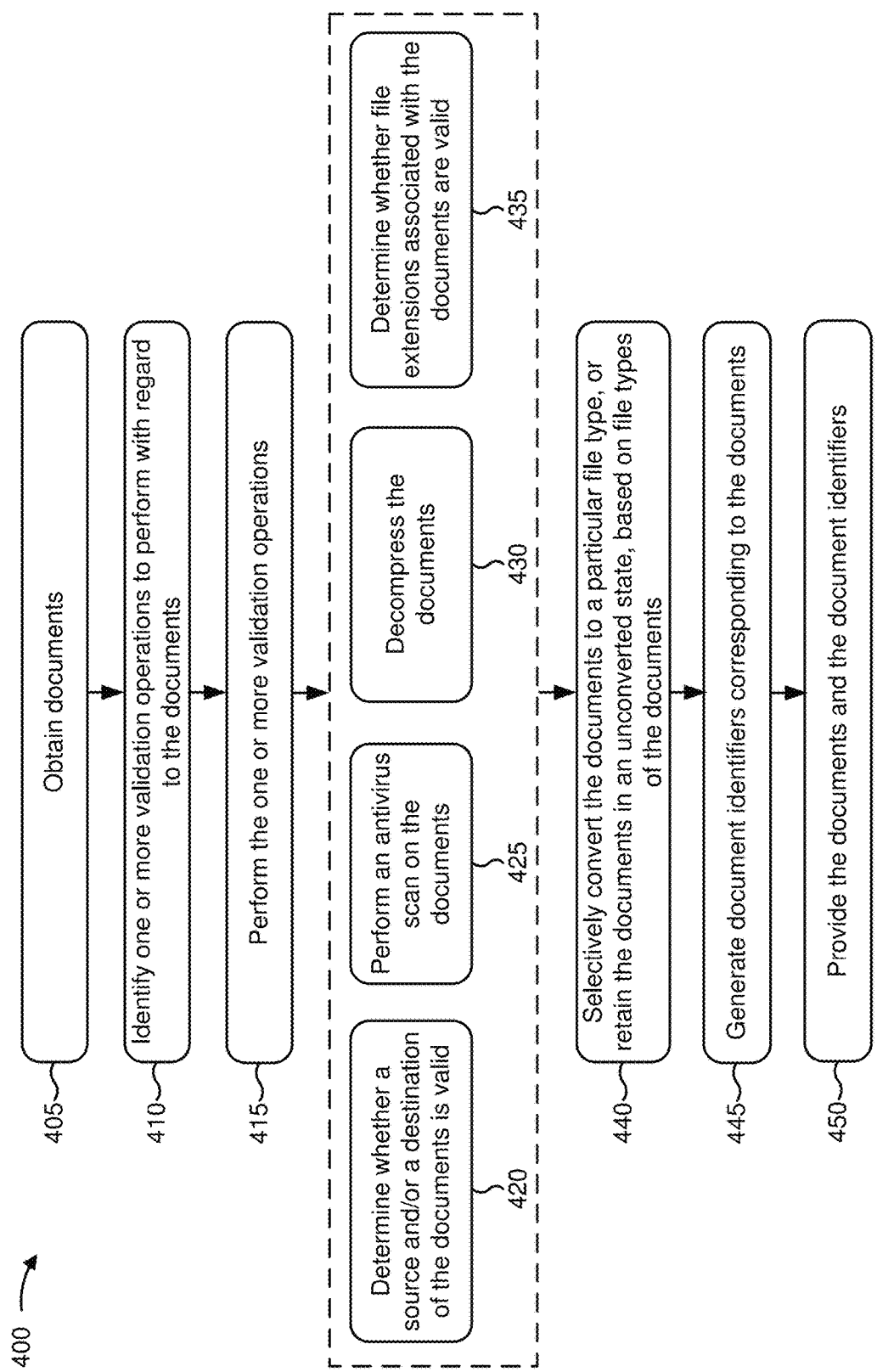
FIG. 4 is a flow chart of an example process for validating documents.

FIG. 4 is a flow chart of an example process 400 for validating documents. In some implementations, one or more process blocks of FIG. 4 may be performed by intake device 220. In some implementations, one or more process blocks of FIG. 4 may be performed by another device or a group of devices separate from or including intake device 220, such as document processing device 210, data entry device 230, portal device 240, user device 250, and storage device 260.

As shown in FIG. 4, process 400 may include obtaining documents (block 405). For example, intake device 220 may obtain documents. In some implementations, intake device 220 may obtain the documents from another device. For example, intake device 220 may receive the documents from an imaging device (e.g., a camera, etc.), from one or more scanners (e.g., a scanner associated with intake device 220, a scanner associated with a document scanning company, etc.), from a fax machine, from an email server (e.g., in the form of emails and/or attachments to emails), from a removable memory card (e.g., a thumb drive, etc.), from a database, from a repository of documents, or the like.

In some implementations, intake device 220 may obtain the documents via a secure session (e.g., a secure file transfer protocol (FTP) session, a secure hypertext transfer protocol (HTTPS) session, etc.), which improves security of intake device 220. In some implementations, intake device 220 may request one or more credentials from a device that attempts to provide a document to intake device 220. For example, intake device 220 may request a username, a password, a session token, a security key, or the like, to establish a secure session via which to receive documents. In this way, intake device 220 improves security of the intake process.

In some implementations, intake device 220 may obtain the documents from an email server (e.g., based on Post Office Protocol 3 (POP3), Internet Message Access Protocol (IMAP), Simple Mail Transfer Protocol (SMTP), etc.). For example, intake device 220 may query the email server for emails, may download the emails, and may extract the documents from the emails (e.g., may use the emails as documents, may obtain documents that are attached to the emails, etc.). In some implementations, intake device 220 may cause the email server to delete the emails after intake device 220 downloads the emails. By causing the email server to delete the emails, intake device 220 reduces a quantity of emails to process when downloading other emails from the email server at a later time, thus conserving processor and storage resources.

A document may be associated with a client (e.g., a client of the document processing system). For example, the client may generate, receive, and/or use the document in the course of operation. The document may identify information relating to the client. For example, the document may include a receipt for a purchase by the client, an accounts receivable sheet associated with the client, a balance sheet relating to the client, or any other textual information associated with the client. The client may provide documents to intake device 220 for validation and/or processing, and may obtain information relating to the documents based on the documents being processed, as described in more detail below.

The documents may be associated with one or more file formats (e.g., .docx, .doc, .rtf, .xlsx, .xls, .pdf, .html, .xml, .tiff, .jpeg, .ppt, etc.). In some implementations, each of the documents may be associated with a particular file format. In some implementations, intake device 220 may receive documents in different file formats. For example, intake device 220 may receive first documents in a .pdf file format from a scanning center, and may receive second documents in an .html file format based on downloading emails from an email server. In some implementations, the documents may be encrypted, compressed, or the like. For example, a particular document may be compressed, a set of documents may be included in a compressed file, or the like.

In some implementations, intake device 220 may receive a batch of documents. For example, intake device 220 may download a batch of emails from an email server, may receive a batch of documents via a file transfer protocol (FTP) session, may download an email that is associated with multiple attached documents, or the like. Additionally, or alternatively, intake device 220 may obtain documents based on a particular time period. For example, intake device 220 may obtain documents every five minutes, every thirty minutes, once per day, or the like. Additionally, or alternatively, intake device 220 may receive documents as documents are provided by other devices (e.g., portal device 240, user device 250, a scanner, etc.).

As further shown in FIG. 4, process 400 may include identifying one or more validation operations to perform with regard to the documents (block 410). For example, intake device 220 may identify one or more validation operations to perform with regard to the documents. The validation operations may include, for example, determining whether a source and/or destination address of a document are included in a whitelist, performing an antivirus scan, decompressing compressed documents, determining whether documents exceed a maximum threshold file size, determining whether file types and/or file extensions associated with the documents are valid, invalid, or void, determining whether a pair of documents are duplicates of each other, determining whether a particular file contains no documents, obtaining a credential for decrypting an encrypted file, determining whether a received document is corrupted (e.g., based on comparing a hash associated with the received document to a hash generated based on the received document, etc.), or the like.

In some implementations, intake device 220 may identify the one or more validation operations based on an attribute associated with a document. For example, an attribute of a document may include a file type of the document, and intake device 220 may perform antivirus scans on documents that are associated with a particular file type. As another example, an attribute of a document may include a compression status of the document, and intake device 220 may decompress documents that are received in a compressed format. As another example, a an attribute of a document may include a source and/or destination of the document, and intake device 220 may determine whether the source and/or destination are included in a whitelist, may perform an antivirus scan based on the source and/or destination being included in a graylist, may perform an antivirus scan based on the source and/or destination being previously un-encountered by document processing device 210, or the like.

As yet another example, an attribute of a document may include an encryption status of the document, and intake device 220 may obtain a credential (e.g., a security key, etc.) and perform a decryption operation based on receiving an encrypted file. As still another example, an attribute of a document may include a file size of the document, and intake device 220 may reject a document, may split a document into sub-documents, or the like, based on receiving a document of a threshold size. In this way, intake device 220 automatically determines validation operations to perform, which conserves processor resources and organizational time and/or money that would otherwise be used to specify validation operations to perform.

In some implementations, intake device 220 may identify the one or more validation operations based on a model. The model may receive documents, or attributes of documents, as an input, and may output information identifying validation operations to perform on the documents. For example, intake device 220 may identify attributes of a particular document (e.g., a file type, a file size, a source, a destination, etc.) and may input the attributes of the particular document to the model. The model may output information identifying validation operations to perform on the particular document. In this way, intake device 220 uses a model to identify validation operations to perform, which conserves processor resources of intake device 220 and enables intake device 220 to identify validation operations to perform with regard to large quantities of documents (e.g., thousands of documents, millions of documents, billions of documents, etc.).

In some implementations, intake device 220 may train the model based on a machine learning algorithm. For example, intake device 220 may use a set of documents with known attributes and known validation operations to train the model. Intake device 220 may identify a relationship between the known attributes and the known validation operations, and may configure the model based on the relationship. When intake device 220 inputs, to the model, another set of documents that are associated with particular attributes, the model may output, based on the particular attributes and the relationship, validation operations to perform on the other set of documents. In this way, intake device 220 configures a model using a machine learning algorithm, which conserves organizational time and money that are otherwise used to configure rules for determining validation operations to perform.

In some implementations, intake device 220 may update the model based on a set of documents. For example, assume that intake device 220 trains a model using a first set of documents, and assume that intake device 220 inputs a second set of documents to the model. Based on attributes of the second set of documents, the model may output validation operations to perform with regard to the second set of documents. If the validation operations outputted by the model do not match validation operations that should be performed with regard to the second set of documents, intake device 220 may reconfigure the model. For example, intake device 220 may use a machine learning algorithm to configure the model based on the attributes of the second set of documents and based on the validation operations that should be performed. In this way, intake device 220 conserves processor resources by improving accuracy of the model and thereby reduces erroneously performed validation operations.

In some implementations, intake device 220 may receive and store multiple, different sets of documents. For example, intake device 220 may receive a first set of documents from a first client, and may receive a second set of documents from a second client. In some implementations, intake device 220 may store the first set of documents separately from the second set of documents. For example, intake device 220 may store the first set of documents in a first storage location, and may store the second set of documents in a second, different storage location. In this way, intake device 220 improves security of the documents by reducing a likelihood that the second client gains access to the first set of documents and/or that the first client gains access to the second set of documents.

As further shown in FIG. 4, process 400 may include performing the one or more validation operations (block 415). For example, intake device 220 may perform the one or more validation operations, as described in more detail in connection with blocks 420-435, below. Intake device 220 may perform the one or more validation operations to convert the documents to a common form that permits document processing device 210 to perform processing operations on the documents. In some implementations, intake device 220 may perform a first validation operation with regard to a first document, and may perform a second validation operation with regard to a second document (e.g., based on attributes of the first document and the second document), as described in more detail below. In some implementations, intake device 220 may perform a single validation operation with regard to the documents, and may successfully validate, or fail to validate, the documents based on a result of the validation operation.

In some implementations, intake device 220 may perform multiple, different validation operations with regard to the documents, and may successfully validate, or fail to validate, the documents based on results of the multiple, different validation operations. For example, in some cases, intake device 220 may perform a first validation operation, and may perform one or more other validation operations based on a result of the first validation operation. In some implementations, intake device 220 may determine whether to perform the one or more other validation operations based on whether the first validation operation was successful, based on system resources (e.g., processor resources and/or storage resources) consumed by performing the first validation operation, or the like. In some implementations, intake device 220 may generate a ranked list of validation operations, and may perform a series of validation operations based on the ranked list.

In some implementations, intake device 220 may successfully validate the documents. For example, the documents may satisfy each validation operation performed by intake device 220. In such a case, intake device 220 may perform the operations described in connection with blocks 440-450, below. In some implementations, intake device 220 may fail to validate the documents. For example, the documents may not satisfy one or more of the validation operations performed by intake device 220. In that case, intake device 220 may notify an administrator that intake device 220 has failed to validate a document, may provide information identifying the documents to a client associated with the documents, may delete the documents, may quarantine the documents, or the like.

In some implementations, intake device 220 may store or provide status information identifying a result of performing the one or more validation operations. For example, intake device 220 may provide, to document processing device 210 or the like, status information identifying the result of performing the one or more validation operations. Additionally, or alternatively, intake device 220 may store status information locally. In some implementations, intake device 220 may store or provide status information for multiple, different validation operations. For example, assume that intake device 220 performs a first validation operation, then a second validation operation, and then a third validation operation. In that case, intake device 220 may store or provide information identifying results of the first validation operation, the second validation operation, and/or the third validation operation. Intake device 220, or another device (e.g., document processing device 210, etc.) may provide the information identifying the results to another party (e.g., portal device 240, user device 250, user device 250 via portal device 240, an administrator of document processing device 210, etc.), which enables the other party to audit results of the validation operations.

As further shown in FIG. 4, process 400 may include determining whether a source and/or a destination of the documents is valid (block 420). For example, intake device 220 may perform a validation operation to determine whether a source and/or a destination of the documents is valid. In some implementations, intake device 220 may determine whether the source and/or destination (e.g., a source/destination email address, a source/destination network address, a source/destination physical address, etc.) are included in a whitelist, a blacklist, a graylist, or the like.

In a situation where the source and the destination are included in a whitelist, intake device 220 may successfully validate the documents. In a situation where the source or the destination is included in a blacklist, intake device 220 may fail to validate the documents. In a situation where the source and/or the destination is included in a graylist, intake device 220 may notify a particular party that the source and/or the destination are included in the graylist. The particular party may cause intake device 220 to successfully validate the documents, to fail to validate the documents, and/or to perform an action with regard to the documents (e.g., quarantining the documents, storing information identifying the source and/or the destination, adding the source and/or the destination to a blacklist and/or a whitelist, etc.).

As further shown in FIG. 4, process 400 may include performing an antivirus scan on the documents (block 425). For example, intake device 220 may perform an antivirus scan on the documents to detect whether the documents include a malicious object. In some implementations, intake device 220 may perform another type of scan on the documents (e.g., a malware scan, a spyware scan, etc.). In some implementations, intake device 220 may provide the documents to another device, and the other device may perform the antivirus scan. In a situation where the documents contain no malicious objects, intake device 220 may successfully validate the documents.

In a situation where the documents are associated with one or more malicious objects, intake device 220 may fail to validate the documents. In such a case, intake device 220 may quarantine or delete the documents. For example, intake device 220 may quarantine or delete any document that includes a malicious object, may quarantine or delete a set of documents that are associated with a document that includes a malicious object (e.g., based on a source and/or destination of the set of documents, a file type of the set of documents, based on the set of documents being received in a particular batch, etc.), or the like.

As further shown in FIG. 4, process 400 may include decompressing the documents (block 430). For example, in a situation where the documents are compressed (e.g., in a .zip file type, a .rar file type, a .7z file type, etc.), intake device 220 may decompress the documents. In some implementations, intake device 220 may decompress a file that includes the documents, and may obtain the documents from the decompressed file. Additionally, or alternatively, intake device 220 may decompress a single, compressed document to obtain an uncompressed document.

In some implementations, intake device 220 may validate documents based on decrypting the documents. For example, in some cases, intake device 220 may store a private key of a public key/private key pair. In such cases, a device and/or party that provides the documents to intake device 220 may encrypt the documents using the corresponding public key, and intake device 220 may decrypt the documents using the private key. In this way, intake device 220 improves security of the document intake process.

As further shown in FIG. 4, process 400 may include determining whether file extensions associated with the documents are valid (block 435). For example, intake device 220 may determine whether file extensions (e.g., file types, file formats, etc.) associated with the documents are valid. In some implementations, intake device 220 may determine whether a file extension is valid based on comparing one or more file extensions, associated with the documents, to a list of file extensions. The list of file extensions may identify permissible file extensions, impermissible file extensions, file extensions based on which to quarantine corresponding documents, or the like. Intake device 220 may compare file extensions associated with the documents to file extensions identified by the list of file extensions, and may successfully validate, or fail to validate, the documents accordingly.

In some implementations, intake device 220 may determine whether a file extension is valid based on information associated with a particular document. For example, intake device 220 may store information indicating that documents from a particular source are to be associated with a particular file extension, and may fail to validate documents, from the particular source, that are not associated with the particular file extension. As another example, intake device 220 may receive information indicating that a document is associated with a particular type of task and/or process, may store information indicating that documents associated with the particular type of task and/or process are to have a particular file extension, and may successfully authenticate, or fail to authenticate, the received document based on whether the received document is associated with the particular file extension.

As further shown in FIG. 4, process 400 may include selectively converting the documents to a particular file type, or retaining the documents in an unconverted state, based on file types of the documents (block 440). For example, in some cases, intake device 220 may provide documents to document processing device 210 in a particular file type. When intake device 220 receives a document, intake device 220 may determine whether a file type of the document matches the particular file type. In a situation where the file type of the document does not match the particular file type, intake device 220 may convert the documents to the particular file type. In this way, intake device 220 conserves processing resources and/or storage resources of document processing device 210 that would otherwise be used to process documents of varying file types. In a situation where the file type of the document matches the particular file type, intake device 220 may not convert the file type (i.e., may retain the document in an unconverted state), which conserves processor resources of intake device 220.

In some implementations, intake device 220 may convert a document after performing validation operations on the document, which conserves processor resources of intake device 220 that may otherwise be used to convert invalid documents. Additionally, or alternatively, intake device 220 may convert the document after performing part of, and not all of, the validation operations. For example, intake device 220 may decompress the document, may perform an antivirus scan on the document, and then may convert the document to a particular file type before performing a remainder of the validation operations. In this way, intake device 220 may simplify the remaining validation operations, which conserves processor resources.

In some implementations, intake device 220 may convert documents, or may retain documents in an unconverted state, based on a preference of a client associated with the documents. For example, intake device 220 may perform validation operations and/or other intake operations more quickly on unconverted documents, which may reduce congestion at intake device 220. In such a case, a client associated with the documents may specify not to convert documents provided to intake device 220. Alternatively, document processing device 210 may process documents of a particular file type more efficiently, which may reduce latency when the client obtains the documents, after processing, as described in more detail below. In such a case, the client may specify to convert the documents.

In some implementations, intake device 220 may convert documents, or may retain documents in an unconverted state, based on operational conditions of intake device 220. For example, in a situation where intake device 220 is associated with a queue of received documents to be processed, is associated with a deficit of processor resources and/or storage space, or the like, intake device 220 may cease converting documents to a particular file type. In this way, intake device 220 reduces processing time, which allows intake device 220 to more quickly process the received documents.

In some implementations, intake device 220 may convert documents using a particular document conversion software (e.g., Neevia, VeryPDF, etc.). In some implementations, intake device 220 may convert documents to a text-selectable format. For example, in a situation where a document includes images of text, intake device 220 may detect the text (e.g., based on an optical character recognition software, such as Cvision, Neevia, Omnipage, etc.), and may convert the document to a format in which the text displayed by the images is selectable by a user, a device, a computer program, or the like.

In some implementations, intake device 220 may convert documents based on a particular video dot density (e.g., based on a video dot density of approximately 100 dots per inch, approximately 150 dots per inch, approximately 200 dots per inch, approximately 300 dots per inch, or another video dot density). In some implementations, intake device 220 may convert documents to a particular file type (e.g., .pdf, .tiff, .jpg, etc.). In some implementations, intake device 220 may convert documents based on a particular color palette (e.g., 1 bit per pixel, 4 bits per pixel, 8 bits per pixel, etc.) and/or a particular black/white color boundary.

A black/white color boundary may identify a threshold shade at which a gray shade is converted to black (e.g., when the gray color satisfies the threshold shade) or white (e.g., when the gray color does not satisfy the threshold). For example, assume that a shade value of 0 is a black shade, and assume that a shade value of 255 is a white shade. Assume that intake device 220 selects a threshold shade of 190. In that case, dots in documents that are associated with a shade value between 0 and 189 may be converted to black, and dots that are associated with a shade value between 190 and 255 may be converted to white. In this way, intake device 220 conserves storage space that would otherwise be used to store information identifying shades in the documents.

As further shown in FIG. 4, process 400 may include generating document identifiers corresponding to the documents (block 445). For example, intake device 220 may generate document identifiers corresponding to the documents. In some implementations, a document identifier may include a string of one or more characters, a coded image (e.g., a Quick Response code, a barcode, etc.), or the like. In some implementations, a document identifier for a particular document may be randomly generated. Additionally, or alternatively, a document identifier may be generated based on information associated with a particular document. For example, the document identifier may be generated based on a source and/or destination of the particular document, a time at which the particular document was received, a time at which the particular document was validated, a party associated with the particular document (e.g., a supplier, a client, a party that generated the document, etc.), information relating to contents of the particular document, information relating to a document type of the particular document (e.g., invoice, receipt, accounting document, etc.), or the like.

In some implementations, intake device 220 may generate a document identifier corresponding to a single document. In some implementations, intake device 220 may generate a document identifier corresponding to multiple, different documents. For example, intake device 220 may generate a document identifier for a set of documents that are received in a compressed file, in a batch, or the like, as set of documents that are received from the same source, a set of documents that are in the same format, or the like. In some implementations, intake device 220 may generate a document identifier corresponding to a document and an email. For example, in a situation where intake device 220 obtains a document that is attached to an email, intake device 220 may generate a document identifier that is associated with the document and the email.

In some implementations, intake device 220 may associate a document identifier with a corresponding document. For example, intake device 220 may imprint the document identifier on the document (e.g., on a particular portion of the document, on a first page of the document, on a last page of the document, on each page of the document, on some, but not all pages of the document, etc.). Additionally, or alternatively, intake device 220 may append, to the document, the document identifier. For example, intake device 220 may add a page to the document that includes the document identifier (e.g., before a first page of the document, after a last page of the document, etc.).

As further shown in FIG. 4, process 400 may include providing the documents and the document identifiers (block 450). For example, intake device 220 may provide the documents and the corresponding document identifiers. In some implementations, intake device 220 may provide the documents and the document identifiers to document processing device 210 for processing. Additionally, or alternatively, intake device 220 may provide the documents and the document identifiers to storage device 260 for storage. In this way, intake device 220 validates and converts documents received in a variety of file types and/or from a variety of sources, and provides the documents for processing and/or storage.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
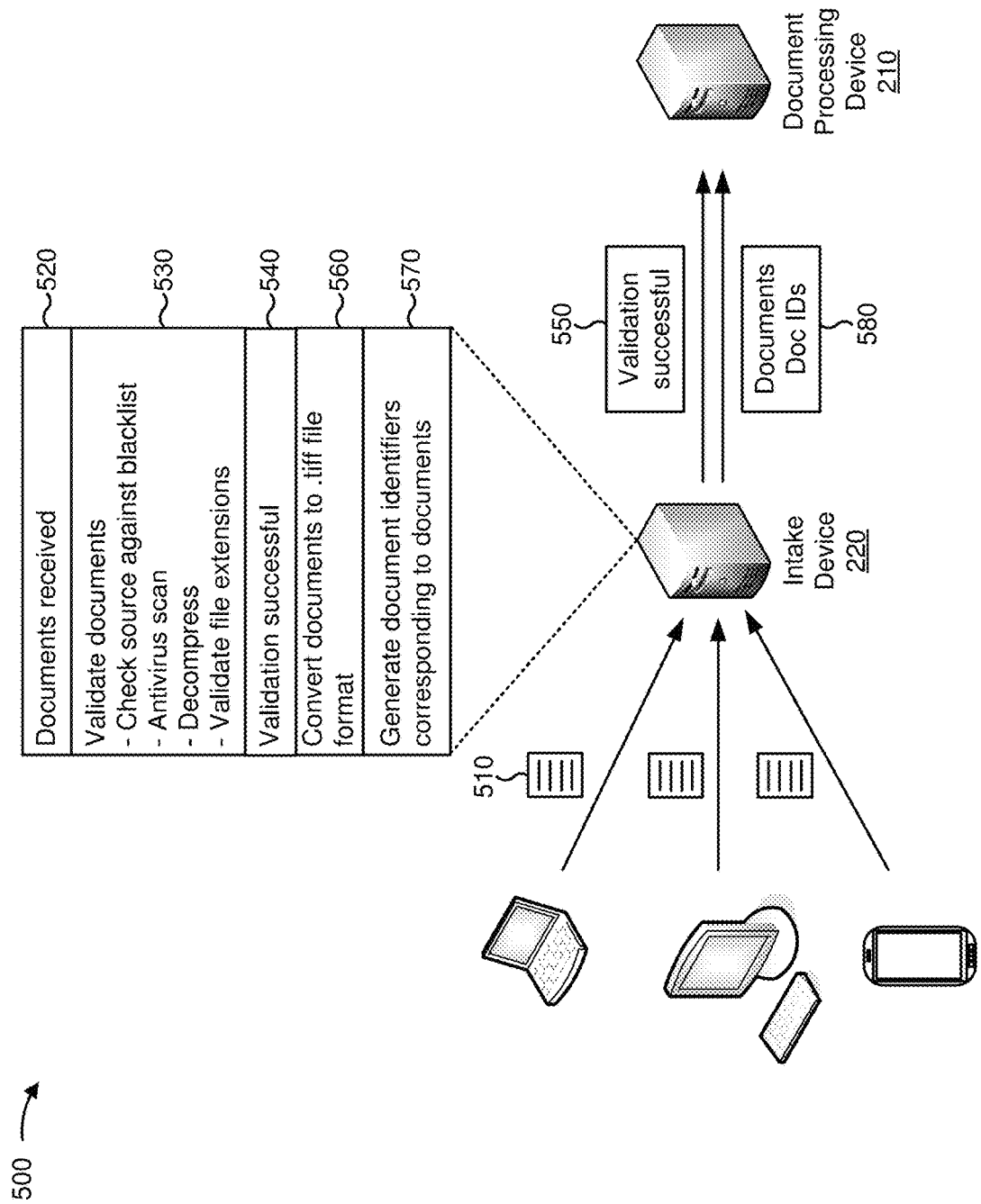
FIG. 5 is a diagram of an example implementation relating to the example process shown in FIG. 4.

FIG. 5 is a diagram of an example implementation 500 relating to example process 400 shown in FIG. 4. FIG. 5 shows an example of validating documents.

As shown in FIG. 5, and by reference number 510, a variety of devices may transmit documents to intake device 220. In some cases, intake device 220 may be centralized (e.g., may be implemented in association with document processing device 210). In some cases, intake device 220 may be distributed. For example, intake device 220 may be located at and/or implemented by a client that provides the documents. As another example, multiple, different intake devices 220 (e.g., that are distributed across different geographical locations, different clients, etc.) may receive documents for validation. As shown by reference number 520, intake device 220 may receive the documents.

As shown by reference number 530, intake device 220 may validate the received documents. To validate the received documents, intake device 220 may perform a variety of validation operations. Here, intake device 220 determines whether sources of the documents are included in a blacklist, performs antivirus scans on the documents, decompresses the documents (e.g., if the documents are received in a compressed state), and validates file extensions of the documents (e.g., determines whether file extensions of the documents match expected file extensions, match prohibited file extensions, etc.). Assume that each validation operation, of the four validation operations, is successful for each received document. As shown by reference number 540, intake device 220 may successfully validate the documents (e.g., based on each validation operation being successful).

As shown by reference number 550, intake device 220 may provide a message to document processing device 210 indicating that intake device 220 successfully validated the documents. Document processing device 210 may generate and/or modify status information of the validated documents based on the message, as described in more detail in connection with FIG. 6, below.

As shown by reference number 560, in some cases, intake device 220 may convert the documents to a particular file format (e.g., a .tiff format), which saves processor resources and/or storage resources of document processing device 210 and/or storage device 260 when processing and/or storing the documents. As shown by reference number 570, intake device 220 may generate document identifiers corresponding to the documents. The document identifiers may include, for example, random strings of one or more characters, information describing and/or identifying the documents, or the like. As shown by reference number 580, intake device 220 may provide the documents and the document identifiers to document processing device 210 for processing. In this way, intake device 220 validates documents to ensure that the documents can be processed by document processing device 210, which conserves processor resources associated with processing incompatible documents and improves security of document processing device 210.

As indicated above, FIG. 5 is provided merely as an example. Other examples are possible and may differ from what was described with regard to FIG. 5.

FIG. 6 is a flow chart of an example process 600 for processing documents. In some implementations, one or more process blocks of FIG. 6 may be performed by document processing device 210. In some implementations, one or more process blocks of FIG. 6 may be performed by another device or a group of devices separate from or including document processing device 210, such as intake device 220, data entry device 230, portal device 240, user device 250, and storage device 260.

As shown in FIG. 6, process 600 may include receiving documents and document identifiers corresponding to the documents (block 610). For example, document processing device 210 may receive documents and document identifiers corresponding to the documents. In some implementations, document processing device 210 may receive the documents from intake device 220. For example, intake device 220 may receive the documents, may validate and/or convert the documents to a particular file type, and may provide the documents to document processing device 210 for processing. In some implementations, intake device 220 may provide the documents to document processing device 210 as intake device 220 receives and validates the documents. Additionally, or alternatively, intake device 220 may validate and store documents locally, and may provide batches of documents to document processing device 210 (e.g., based on a particular time period, based on a particular quantity of documents, based on a particular file size of a batch of documents, based on a request from document processing device 210, etc.). By storing documents locally, intake device 220 reduces local storage requirements of document processing device 210.

In some implementations, document processing device 210 may obtain the documents from storage device 260. For example, intake device 220 may provide the documents for storage by storage device 260, and document processing device 210 may obtain the documents from storage device 260. In some implementations, document processing device 210 may obtain the documents based on operational parameters of document processing device 210. For example, document processing device 210 may determine that document processing device 210 has sufficient processor resources, storage resources, or the like, to process a particular quantity of documents, and may obtain the particular quantity of documents from storage device 260.

As further shown in FIG. 6, process 600 may include determining one or more processing operations to perform on the documents (block 620). For example, document processing device 210 may identify one or more processing operations to perform on the documents. The one or more processing operations may include, for example, performing an optical character recognition operation on a document, sorting a set of documents, managing a document queue (e.g., a queue for data entry processing, a queue for outputting to portal device 240 and/or user device 250, etc.), providing a document for data entry, or the like, as described in more detail below.

In some implementations, document processing device 210 may determine the one or more processing operations to perform based on information associated with a set of documents. For example, in a situation where the set of documents is associated with a particular client, document processing device 210 may identify processing operations to perform based on a preference of the particular client with regard to which processing operations may be performed. As another example, in a situation where a set of documents includes images of text, document processing device 210 may determine to perform an optical character recognition operation with regard to the set of documents. In this way, document processing device 210 automatically determines processing actions to perform, which conserves processor resources and/or organizational resources that would otherwise be used to specify processing actions to perform, and which enables document processing device 210 to process large quantities of documents (e.g., thousands of documents, millions of documents, billions of documents, etc.).

In some implementations, document processing device 210 may identify the one or more processing operations based on a model. The model may receive documents, or information associated with documents, as an input, and may output information identifying processing operations to perform on the documents. For example, document processing device 210 may identify information associated with a particular document (e.g., a client associated with the particular document, whether the particular document includes un-selectable text, a particular status, etc.) and may input the information associated with the particular document to the model. The model may output information identifying processing operations to perform on the particular document. In this way, document processing device 210 uses a model to identify processing operations to perform, which conserves processor resources of document processing device 210 and enables document processing device 210 to identify processing operations to perform with regard to large quantities of documents.

In some implementations, document processing device 210 may train the model based on a machine learning algorithm. For example, document processing device 210 may use a set of documents with known inputs and known processing operations to train the model. Document processing device 210 may identify a relationship between the known inputs and the known processing operations, and may configure the model based on the relationship. When document processing device 210 inputs, to the model, another set of documents that are associated with particular inputs, the model may output, based on the particular inputs and the relationship, processing operations to perform on the other set of documents. In this way, document processing device 210 configures a model using a machine learning algorithm, which conserves organizational time and money that are otherwise used to configure rules for determining processing operations to perform.

In some implementations, document processing device 210 may update the model based on a set of documents. For example, assume that document processing device 210 trains a model using a first set of documents, and assume that document processing device 210 inputs a second set of documents to the model. Based on information associated with the second set of documents, the model may output processing operations to perform with regard to the second set of documents. If the processing operations outputted by the model do not match processing operations that should be performed with regard to the second set of documents, document processing device 210 may reconfigure the model. For example, document processing device 210 may use a machine learning algorithm to configure the model based on the information associated with the second set of documents and based on the processing operations that should be performed. In this way, document processing device 210 conserves processor resources by improving accuracy of the model and thereby reduces erroneously performed processing operations.

In some implementations, portal device 240 may request a particular document, and document processing device 210 may determine an action to perform with regard to the particular document. For example, assume that storage device 260 stores a set of documents for which document processing device 210 has not performed an optical character recognition process. Assume further that document processing device 210 receives an instruction, from user device 250 and via portal device 240, to cause document processing device 210 to provide a particular document of the set of documents. In that case, document processing device 210 may perform, or may cause to be performed, the optical character recognition process for the particular document. In this way, document processing device 210 conserves storage resources of storage device 260 and processing resources of document processing device 210, by delaying optical character recognition operations for documents until the documents are requested.

As further shown in FIG. 6, process 600 may include performing the one or more processing operations (block 630). For example, document processing device 210 may perform the one or more processing operations. In some implementations, document processing device 210 may cause the one or more processing operations to be performed by another device (e.g., data entry device 230, user device 250, a device configured to perform optical character recognition operations, etc.).

In some implementations, document processing device 210 may store or provide status information identifying a result of performing the one or more processing operations. For example, document processing device 210 may provide, to portal device 240, user device 250 (e.g., via portal device 240), storage device 260, or the like, status information identifying the result of performing the one or more processing operations. Additionally, or alternatively, document processing device 210 may store status information locally. In some implementations, document processing device 210 may store or provide status information identifying results of multiple, different processing operations. For example, assume that document processing device 210 performs a first processing operation, then a second processing operation, and then a third processing operation.

In some implementations, the status information for a particular document may identify results of one or more validation operations performed by intake device 220. For example, document processing device 210 may generate the status information for the particular document based on receiving information from intake device 220 indicating that one or more validation operations are successful. Based on processing the particular document, document processing device 210 may update the status information, to generate updated status information, to indicate results of performing the one or more processing operations. In this way, document processing device 210 generates and updates status information, which permits user device 250 to obtain a history of operations performed with regard to the particular document, thereby enabling a client to audit the processing of the particular document.

As further shown in FIG. 6, process 600 may include providing the documents for processing by a data entry device (block 640). For example, in some cases, the processing operation may include providing the documents for processing by data entry device 230. In some implementations, data entry device 230 may be associated with one or more workers. For example, data entry device 230 may include a device that presents documents to the one or more workers (e.g., via a display of data entry device 230, via displays of devices associated with data entry device 230, etc.) and permits the one or more workers to input data describing the one or more documents. In some implementations, data entry device 230 may be associated with a crowdsourcing platform, a data entry company, or the like. Additionally, or alternatively, data entry device 230 may be associated with a client that provides the documents, with a party that provides document processing device 210, or the like.

In some implementations, document processing device 210 may provide the documents for processing by data entry device 230 to obtain data that is difficult, expensive, or impossible to obtain automatically. For example, assume that a set of documents includes documents that are associated with multiple, different companies in multiple, different technology areas. Assume further that document processing device 210 is to determine corresponding technology areas for each of the multiple, different companies, which may be difficult to automatically determine. In that case, document processing device 210 may provide the set of documents to document processing device 210, and workers associated with document processing device 210 may provide data identifying the technology areas and/or the companies.

In some implementations, the data provided by data entry device 230 may include, for example, information identifying a document type (e.g., invoice, bill, personal check, paycheck, bill of lading, receipt, tax return, etc.), a company (e.g., a name of the company, a code associated with the company, an industry or technology area associated with the company, etc.), a client, a supplier, a product, or the like.

In some implementations, document processing device 210 may determine to provide documents for processing by data entry device 230 based on an accuracy of an automated process performed on the documents. For example, assume that document processing device 210 performs an optical character recognition operation on a set of documents. Assume further that document processing device 210 determines that data provided by the optical character recognition operation does not satisfy an accuracy threshold (e.g., based on a percentage of characters detected, based on a percentage of words detected that match known words, etc.). In that case, document processing device 210 may provide the set of documents to data entry device 230, and data entry device 230 may obtain the data that was originally to be determined by the optical character recognition operation. In this way, document processing device 210 and data entry device 230 improve accuracy of the data.

In some implementations, document processing device 210 may provide a document to data entry device 230 based on an error or an exception associated with processing the document. For example, in a situation where document processing device 210 encounters an error, an unhandled exception, or the like, when processing a particular document, document processing device 210 may provide information identifying the error, the unhandled exception, or the like, to data entry device 230. Data entry device 230 may provide information to mitigate the error, may provide data associated with the particular document (e.g., data that was to be obtained by processing the particular document), or the like. In this way, data entry device 230 facilitates error handling and exception handling, which improves stability of document processing device 210.

As further shown in FIG. 6, process 600 may include receiving data describing the documents (block 650). For example, document processing device 210 may receive data describing the documents from data entry device 230. In some implementations, document processing device 210 may receive the data in association with the documents. For example, data entry device 230 may append the data to the documents, may include the data in the documents, may replace content in the documents with the data, or the like. Additionally, or alternatively, document processing device 210 may receive the data in association with document identifiers corresponding to the documents. Document processing device 210 may store and/or provide the data, as described in more detail below.

As further shown in FIG. 6, process 600 may include performing an optical character recognition operation on the documents (block 660). For example, document processing device 210 may perform an optical character recognition operation on the documents. Document processing device 210 may perform the optical character recognition operation to identify text included in the documents and/or to generate structured data based on the text, which conserves processor resources, organizational time, and/or money that may otherwise be used to identify the text (e.g., manually).

In some implementations, document processing device 210 may provide the documents to another device, and the other device may perform the optical character recognition operation. In this way, document processing device 210 conserves processor resources of document processing device 210. Additionally, or alternatively, intake device 220 may perform the optical character recognition operation in association with the validation and/or conversion process, which also conserves processor resources of document processing device 210.

In some implementations, document processing device 210 may perform the optical character recognition operation based on a particular document template. A document template may identify particular locations in a document, and may indicate that particular text is likely to be located at the particular locations. In some implementations, the document template may include instructions for generating structured data based on the optical character recognition operation. For example, the document template may identify particular locations in a type of document, and may identify values to be associated with text identified at the particular location. As an example, a document template for a receipt may identify a first location at which text describing a client identifier is to be found, a second location at which text describing a sale amount is to be found, a third location at which text describing a transaction location is to be found, and so on.

In some implementations, document processing device 210 may determine a type of document associated with a particular document (e.g., based on information provided by intake device 220 and/or data entry device 230, based on information included in the document, such as a visual code, etc.), and may perform the optical character recognition operation based on a particular document template corresponding to the type of document. By using document templates, document processing device 210 improves accuracy of the optical character recognition operation and thus conserves processor resources and/or organizational resources that would otherwise be used to identify text in documents.

As further shown in FIG. 6, process 600 may include generating a data structure based on the optical character recognition operation (block 670). For example, document processing device 210, or another device that performs the optical character recognition operation, may generate a data structure based on the optical character recognition operation. In some implementations, document processing device 210 may generate a data structure corresponding to a particular document. Additionally, or alternatively, document processing device 210 may generate a data structure corresponding to multiple, different documents. For example, document processing device 210 may generate a spreadsheet describing the documents, an index of values included in the documents, or the like. In some implementations, the data structure may include, for example, a Structured Query Language (SQL) file, a comma-separated value (CSV) table, a tab-separated value (TSV) table, a spreadsheet, an index, or the like.

In some implementations, document processing device 210 may modify a document based on the optical character recognition operation. For example, document processing device 210 may insert text into the document (e.g., to replace the text detected in the document, to overlay the text as detected in the document, etc.), may remove part of a document, may combine two or more documents, may insert a reference to a first document in a second document, or the like.

In some implementations, document processing device 210 may generate the data structure based on a document template. For example, the document template may identify a category for detected text (e.g., "client identifier," "transaction identifier," etc.), and a location, in a document, at which text matching the category can be detected. When document processing device 210 detects text at the location, document processing device 210 may associate the text with the category in a data structure. In this way, document processing device 210 conserves processor resources by enabling data-structure-based queries and/or processing of the documents.

As further shown in FIG. 6, process 600 may include providing the documents and/or document information associated with the documents (block 680). For example, document processing device 210 may provide the documents and/or document information associated with the documents. The document information may include, for example, data obtained from data entry device 230, a data structure that is generated based on an optical character recognition operation, or the like. In some implementations, document processing device 210 may provide the documents and/or the document information to storage device 260 for storage. Additionally, or alternatively, document processing device 210 may provide the documents and/or the document information to portal device 240, user device 250, or the like (e.g., based on an instruction, periodically, etc.).

As further shown in FIG. 6, process 600 may include storing status information identifying the documents and the one or more processing operations (block 690). For example, document processing device 210 may store status information identifying the documents and the one or more processing operations. In some implementations, document processing device 210 may generate and/or update status information identifying the documents and the one or more processing operations. For example, document processing device 210 may identify status information associated with the documents, and may modify the status information to indicate that the one or more processing operations have been performed with regard to the documents.

In some implementations, document processing device 210 may provide the status information. For example, document processing device 210 may provide the status information to storage device 260 for storage, to user device 250 (e.g., based on determining the status information, based on a status request from user device 250, etc.). In this way, document processing device 210 determines status information based on processing documents, which enables user device 250 to audit the one or more processing operations and/or the documents.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
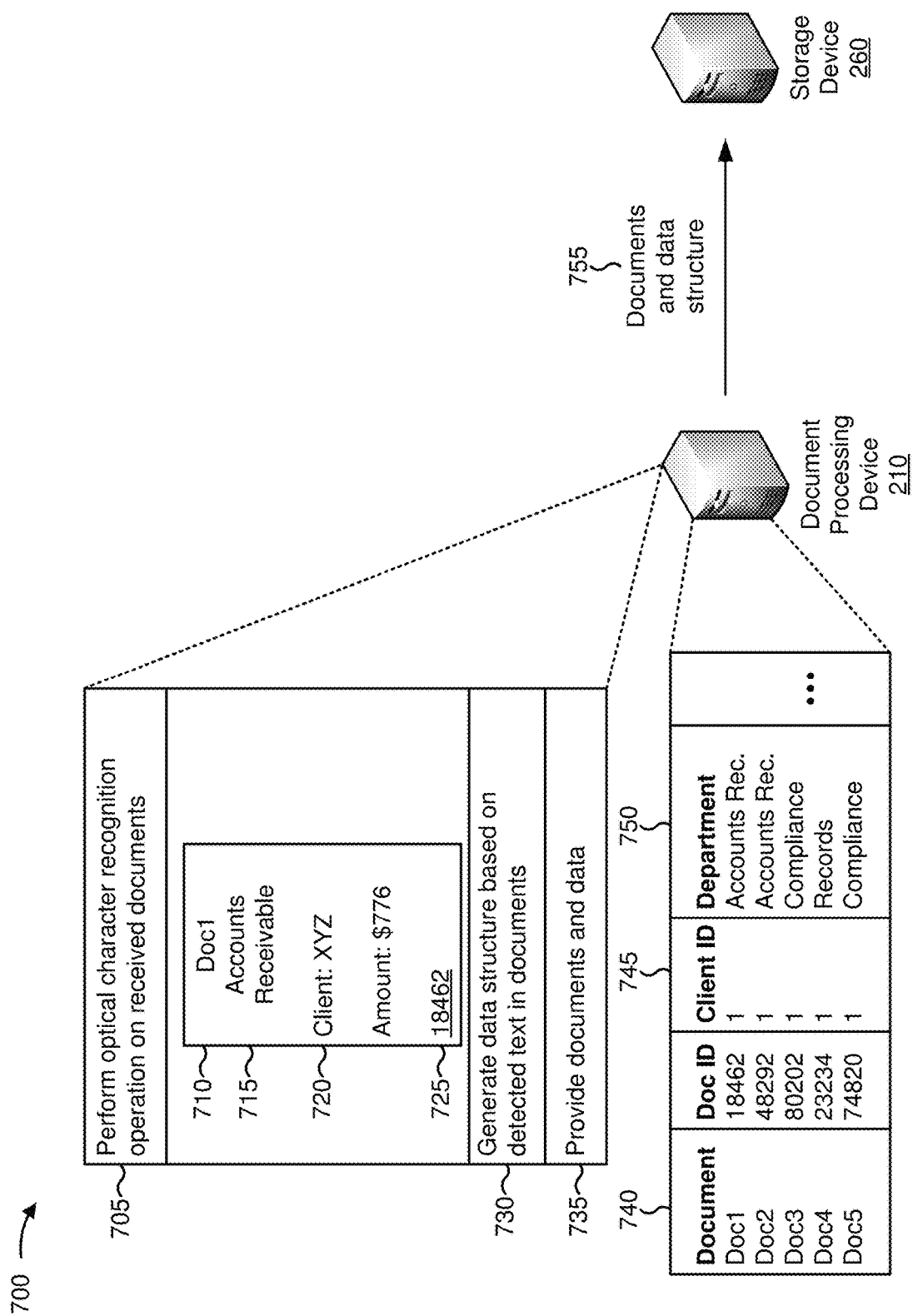
FIGS. 7A and 7B are diagrams of an example implementation relating to the example process shown in FIG. 6.
Figure 7B:
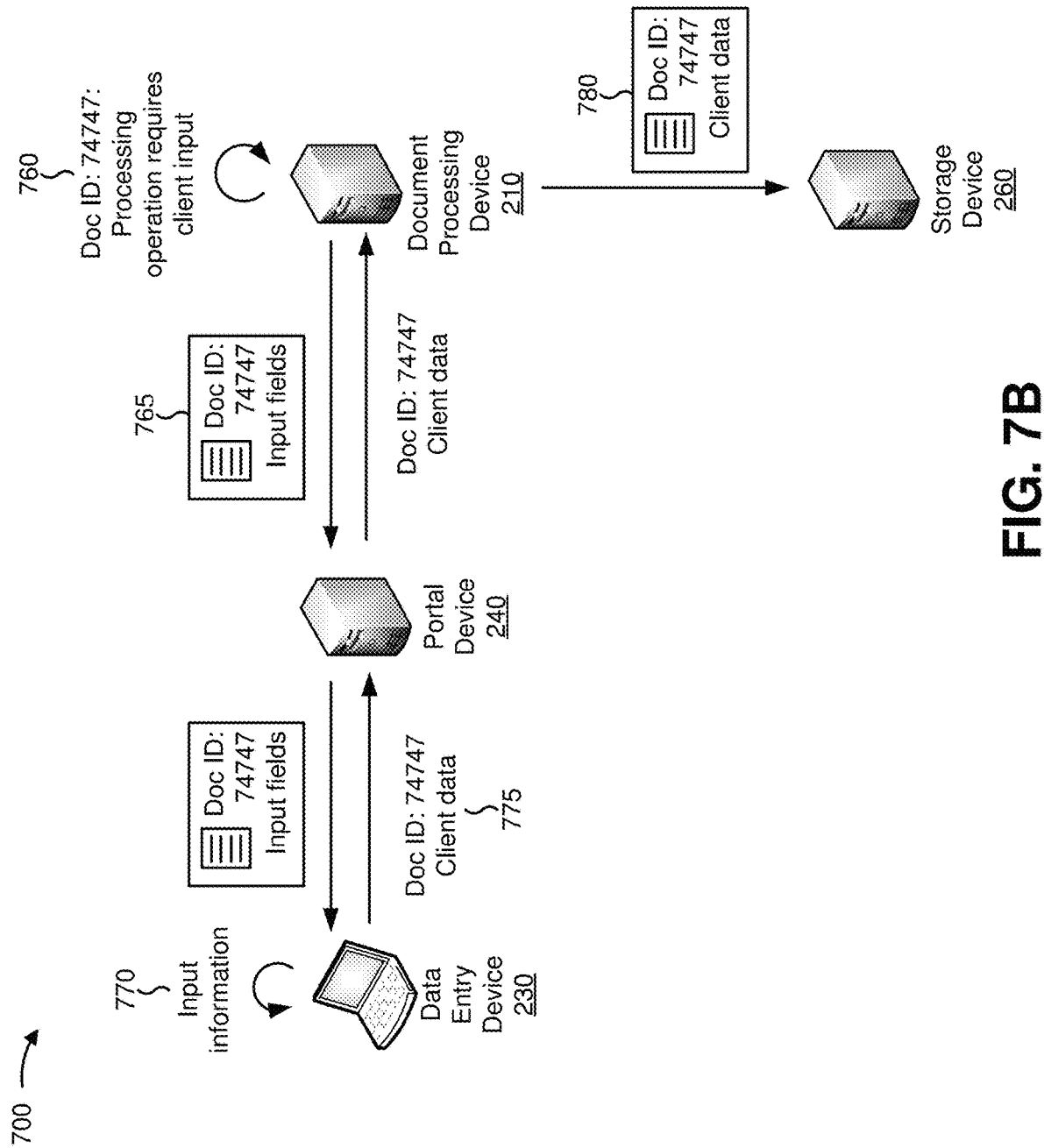

FIGS. 7A and 7B are diagrams of an example implementation 700 relating to example process 600 shown in FIG. 6. FIGS. 7A and 7B show an example of processing documents. For the purpose of FIGS. 7A and 7B, assume the operations described in connection with FIG. 5 have been performed.

As shown in FIG. 7A, and by reference number 705, document processing device 210 may perform an optical character recognition operation on the documents received from intake device 220. By performing the optical character recognition operation, document processing device 210 reduces double-keying of information included in the documents. That is, document processing device 210 reduces a quantity of times that the information included in the documents is inputted (e.g., by a party that generated the documents, by a data entry employee, etc.), which conserves processor resources and organizational time and money, and which improves efficiency the document processing operations.

As shown, a document, of the documents, may include various data. Document processing device 210 may detect the data based on the optical character recognition operation. For example, document processing device 210 may use a document template that is associated with the document (e.g., based on a document type associated with the document). The document template may identify locations in the document at which the data are likely to be found. As shown by reference number 710, the document may include a document title (e.g., Doc1). As shown by reference number 715, the document may include data identifying a particular department (e.g., accounts receivable). As shown by reference number 720, the document may include data identifying a particular client (e.g., Client: XYZ). The client may be associated with a source of the document (e.g., may include a party that generated the document), may be a client of a party that generated the document, or the like. As further shown, the document may identify a monetary amount. As shown by reference number 725, the document may include a document identifier corresponding to the document (e.g., a document identifier generated by intake device 220).

As shown by reference number 730, document processing device 210 may generate a data structure based on the detected text in the documents. As shown by reference number 735, document processing device 210 may provide the documents, and may provide the data. As shown by reference number 740, the data structure may include information identifying the document title and the corresponding document identifier. As shown by reference number 745, the data structure may include a client identifier corresponding to each document. For example, based on detecting the data identifying the particular client (e.g., XYZ), document processing device 210 may assign, to the document, a client identifier of 1 (e.g., based on information associating particular clients with client identifiers, etc.). As shown by reference number 750, the data structure may identify the department associated with each document. In some implementations, the data structure may include additional and/or different information. As shown by reference number 755, document processing device 210 may provide the documents and the data structure to storage device 260 for storage.

In some cases, document processing device 210 may notify a party that processing of the documents is complete. For example, document processing device 210 may notify user device 250 (e.g., via portal device 240) that processing of the documents is complete. Additionally, or alternatively, document processing device 210 may store status information identifying a status of each document of the documents (e.g., may store the status information after processing the documents, may store the status information as document processing device 210 performs the processing operations, etc.). In this way, document processing device 210 enables auditing and querying of document statuses as document processing device 210 processes the documents.

As shown in FIG. 7B, and by reference number 760, in some cases, document processing device 210 may require input from a client associated with a document in order to process the document. Here, document processing device 210 requires input with regard to a document associated with a document identifier of 74747. As shown by reference number 765, document processing device 210 may provide the document to data entry device 230 that is associated with the client via portal device 240. As further shown, to obtain the input, document processing device 210 may provide, in association with the document, input fields. The input fields may be associated with information to be provided by the client (e.g., information identifying one or more parties associated with the document, information identifying an urgency associated with the document, information identifying a supplier associated with the document, information identifying a product associated with the document, etc.) for use by document processing device 210 to process the document.

As shown by reference number 770, a user of data entry device 230 (e.g., an employee of the client, a worker of a crowdsourcing crowd, etc.) may input client data (e.g., the information requested by document processing device 210). As shown by reference number 775, data entry device 230 may provide, to document processing device 210 and via portal device 240, the document identifier and the associated client data. In some implementations, document processing device 210 may provide the document to data entry device 230 and/or may receive the client data from data entry device 230 without transmitting information via portal device 240.

As shown by reference number 780, document processing device 210 may provide the document associated with the document identifier of 74747 and the client data for storage by storage device 260. In this way, document processing device 210 obtains client input when processing documents, which reduces processor usage of document processing device 210 and improves accuracy of the processed documents.

As indicated above, FIGS. 7A and 7B are provided merely as examples. Other examples are possible and may differ from what was described with regard to FIGS. 7A and 7B.

Figure 8:
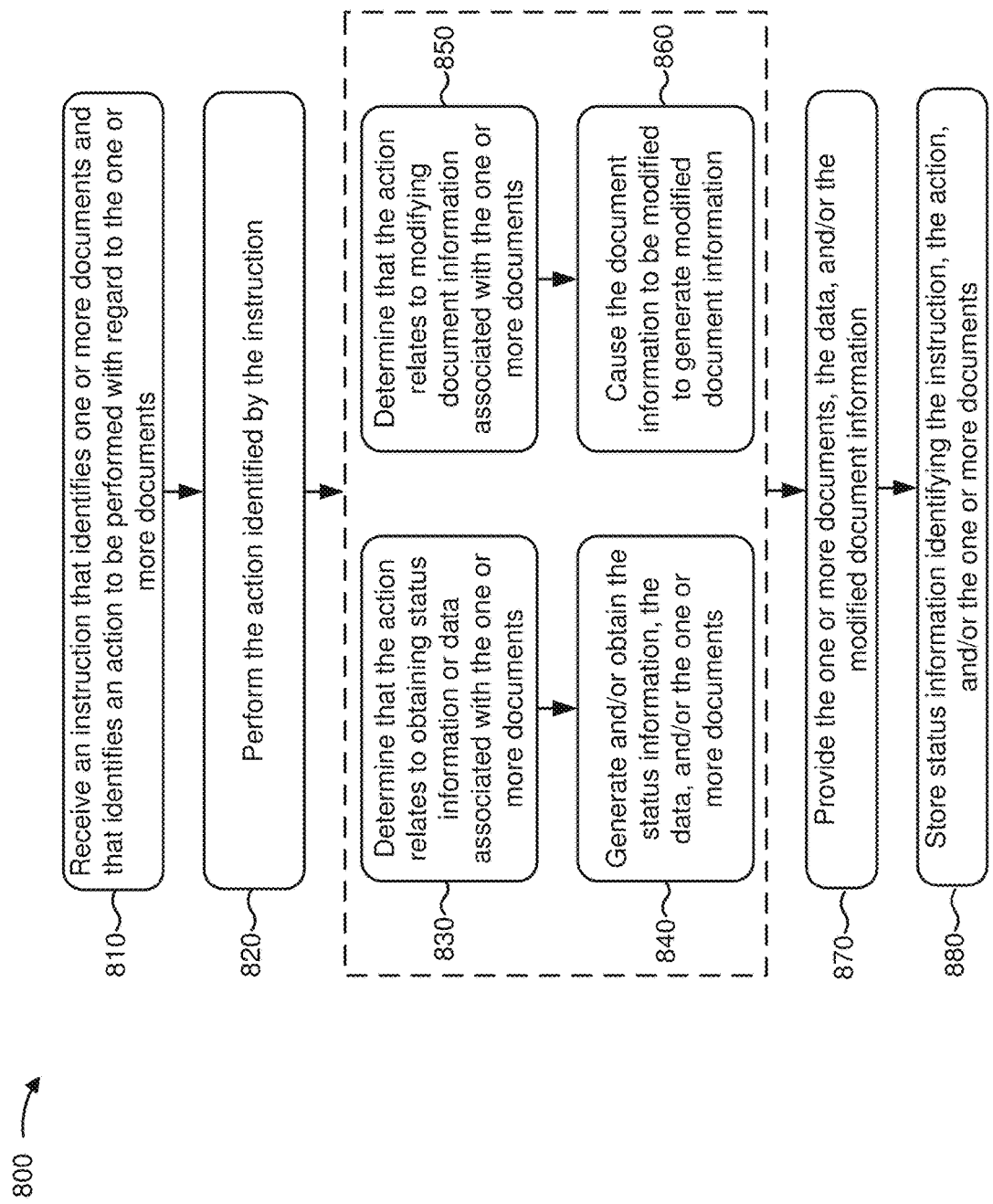
FIG. 8 is a flow chart of an example process for performing actions related to document processing based on receiving instructions.

FIG. 8 is a flow chart of an example process 800 for performing actions related to document processing based on instructions. In some implementations, one or more process blocks of FIG. 8 may be performed by document processing device 210. In some implementations, one or more process blocks of FIG. 8 may be performed by another device or a group of devices separate from or including document processing device 210, such as intake device 220, data entry device 230, portal device 240, user device 250, and storage device 260.

As shown in FIG. 8, process 800 may include receiving an instruction that identifies one or more documents and that identifies an action to be performed with regard to the one or more documents (block 810). For example, document processing device 210 may receive an instruction. The instruction may identify one or more documents (e.g., using document identifiers associated with the one or more documents, etc.), and may identify an action to be performed with regard to the one or more documents. In some implementations, document processing device 210 may receive the instruction from portal device 240. For example, user device 250 (e.g., a user device 250 associated with a client, a user device 250 associated with an administrator of document processing device 210, etc.) may interact with a web application of portal device 240 to generate the instruction, and portal device 240 may transmit the instruction to document processing device 210.

The action may include, for example, obtaining a particular document and/or a set of documents, deleting a document, changing a priority for processing a document, determining a status of document (e.g., validation successful, validation failed, quarantined, processing complete, stored, ready for processing, etc.), modifying document information associated with a document, modifying a document, merging two or more documents, performing a particular processing operation on a document, providing and/or obtaining structured data describing a document, or the like.

As further shown in FIG. 8, process 800 may include performing the action identified by the instruction (block 820). For example, document processing device 210 may perform, or may cause to be performed (e.g., by intake device 220, by data entry device 230, etc.), the action identified by the instruction. In some implementations, document processing device 210 may obtain the one or more documents from storage device 260 to perform the action. Additionally, or alternatively, document processing device 210 may cause storage device 260 to provide the one or more documents to another device (e.g., portal device 240 and/or user device 250, data entry device 230, a device for performing an optical character recognition operation, etc.) for the other device to perform the action. In some implementations, document processing device 210 may store status information identifying the instruction and/or the action, as described in more detail below.

As further shown in FIG. 8, process 800 may include determining that the action relates to obtaining status information and/or data associated with the one or more documents (block 830). For example, in some cases, document processing device 210 may determine that the action relates to obtaining status information and/or data associated with the one or more documents. The data describing the one or more documents may include, for example, information determined based on an optical character recognition operation, information received from data entry device 230 (e.g., data entry device 230 associated with a client, data entry device 230 associated with a crowdsourcing platform, etc.), or the like.

In some implementations, storage device 260 may store the data. For example, document processing device 210 may obtain the data when processing the one or more documents, and may provide the one or more documents and/or the data to storage device 260 for storage. In some implementations, document processing device 210 may determine that storage device 260 does not store the data. For example, storage device 260 may store unprocessed documents, may store documents on which document processing device 210 has not performed an optical character recognition operation, or the like. In this way, document processing device 210 conserves processor resources by postponing processing of documents until document processing device 210 receives a request for data associated with the documents.

As further shown in FIG. 8, process 800 may include generating and/or obtaining the status information, the data, and/or the one or more documents (block 840). For example, document processing device 210 may generate and/or obtain the status information, the data, and/or the one or more documents. In some implementations, document processing device 210 may obtain a security credential from user device 250 to access the one or more documents, which improves security of the one or more documents and document processing device 210.

In a situation where storage device 260 stores the data, document processing device 210 may obtain the data from storage device 260 (e.g., based on one or more document identifiers associated with the one or more documents). In a situation where storage device 260 does not store the data (e.g., in a situation where the data has not been obtained or generated), document processing device 210 may generate the data, or may cause the data to be generated. For example, in some implementations, document processing device 210 may provide documents to storage device 260 without performing optical character recognition operations on the documents. In such a case, document processing device 210 may obtain the one or more requested documents, and may perform an optical character recognition operation on the one or more documents to generate the data. Additionally, or alternatively, document processing device 210 may cause another device to perform the optical character recognition operation, which conserves processor resources of document processing device 210.

In some implementations, to cause another device to perform an optical character recognition operation on a particular document, document processing device 210 may update a status associated with the particular document. For example, storage device 260 may store documents on which an optical character recognition operation has not been performed. The stored documents may be associated with a status indicating that the optical character recognition operation has not been performed on the documents. When document processing device 210 receives an instruction to obtain optical character recognition data for a document on which the optical character recognition operation has not been performed, document processing device 210 may update the status. A device (e.g., an optical character recognition device, an optical character recognition component of document processing device 210, etc.) may monitor the status, and may perform the optical character recognition operation based on the status being updated.

As further shown in FIG. 8, process 800 may include determining that the action relates to modifying document information associated with the one or more documents (block 850). For example, in some cases, the action may relate to modifying document information associated with the one or more documents. Document information for a particular document may include, for example, a position of the document in a queue (e.g., a queue associated with document processing device 210, intake device 220, data entry device 230, etc.), one or more processing steps associated with the document, data determined by document processing device 210 and/or data entry device 230 relating to the document, information identifying a party associated with the document (e.g., responsible for the document, with which the document originates, identified by the document, etc.), metadata describing the particular document, or the like.

As further shown in FIG. 8, process 800 may include causing the document information to be modified to generate modified document information (block 860). For example, document processing device 210 may modify the document information, or may cause the document information to be modified, to generate modified document information. In some implementations, document processing device 210 may cause document information stored at storage device 260 to be modified. Additionally, or alternatively, document processing device 210 may modify document information stored at document processing device 210. For example, document processing device 210 may store document information relating to the one or more documents (e.g., metadata relating to the one or more documents, auditing information relating to the one or more documents, etc.), and may modify the stored document information.

As further shown in FIG. 8, process 800 may include providing the one or more documents, the data, and/or the modified document information (block 870). For example, document processing device 210 may provide particular information based on an action performed by document processing device 210. The particular information may include the one or more documents, the data (e.g., in a situation where the action relates to obtaining and/or generating the data), and/or the modified document information (e.g., in a situation where the action relates to modifying document information). In some implementations, document processing device 210 may provide the particular information to user device 250 (e.g., via portal device 240). In some implementations, document processing device 210 and/or portal device 240 may establish a secure session with user device 250 to provide the particular information, which improves security of document processing device 210 and/or user device 250.

In this way, document processing device 210 generates, obtains, and/or modifies information based on instructions received from user device 250. By performing actions based on instructions from user device 250, document processing device 210 improves accuracy of the document processing process, permits user device 250 to obtain and/or modify processed documents, and enables a party associated with user device 250 to manage documents at each stage of the document processing process. Thus, document processing device 210 improves uniformity of the document processing process, reduces processor usage associated with redundant actions in the document processing process, and improves security of the documents and/or user device 250.

As further shown in FIG. 8, process 800 may include storing status information identifying the instruction, the action, and/or the one or more documents (block 880). For example, document processing device 210 may store information identifying the instruction (e.g., the instruction received from user device 250), the action identified by the instruction, and/or the one or more documents to which the instruction pertains. In some implementations, document processing device 210 may store status information identifying a result of the action. For example, document processing device 210 may store information identifying whether performance of the action was successful, identifying a time at which the action was performed, identifying one or more parties that received information (e.g., documents, data, etc.) based on the action being performed, or the like.

In some implementations, document processing device 210 may store information based on completing an action. Additionally, or alternatively, document processing device 210 may store information as document processing device 210 performs one or more actions. As an example, assume that obtaining a document to perform an optical character recognition operation involves three steps: a first step of modifying a status associated with the document, a second step of obtaining the document based on the modified status, and a third step of performing the optical character recognition operation on the document. In that case, document processing device 210 may store information based on completing the first step, the second step, and the third step.

In some implementations, user device 250, or another device, may obtain the status information at any point in the performance of the optical character recognition operation based on an interaction with portal device 240 (e.g., before the optical character recognition operation is completed, after the optical character recognition operation is completed, before the document is obtained, etc.). In this way, document processing device 210 enables user device 250, or another device, to audit processes performed by document processing device 210 as the processes are performed, which improves transparency of the document processing process.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
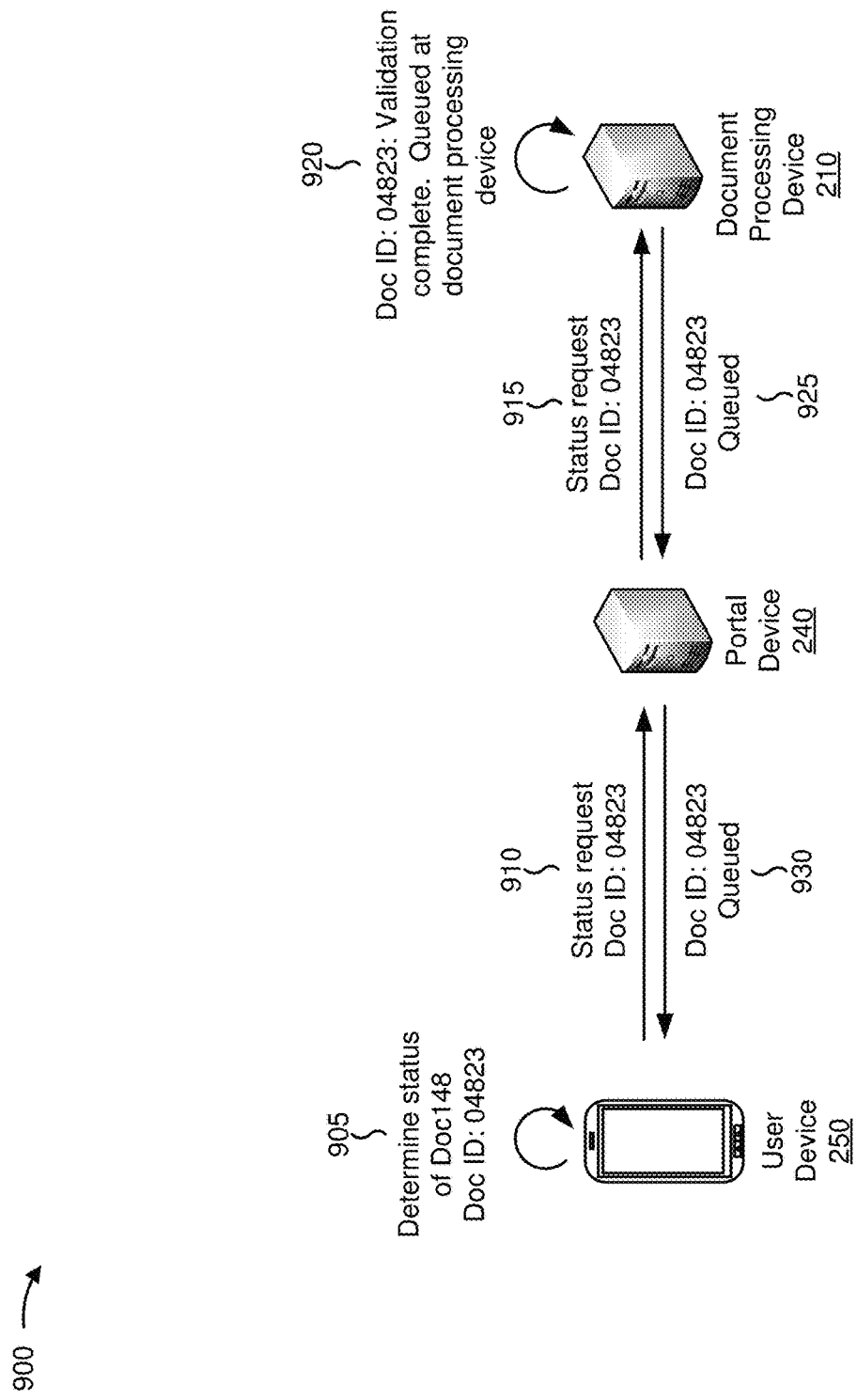
FIGS. 9A and 9B are diagrams of an example implementation relating to the example process shown in FIG. 8.
Figure 9B:
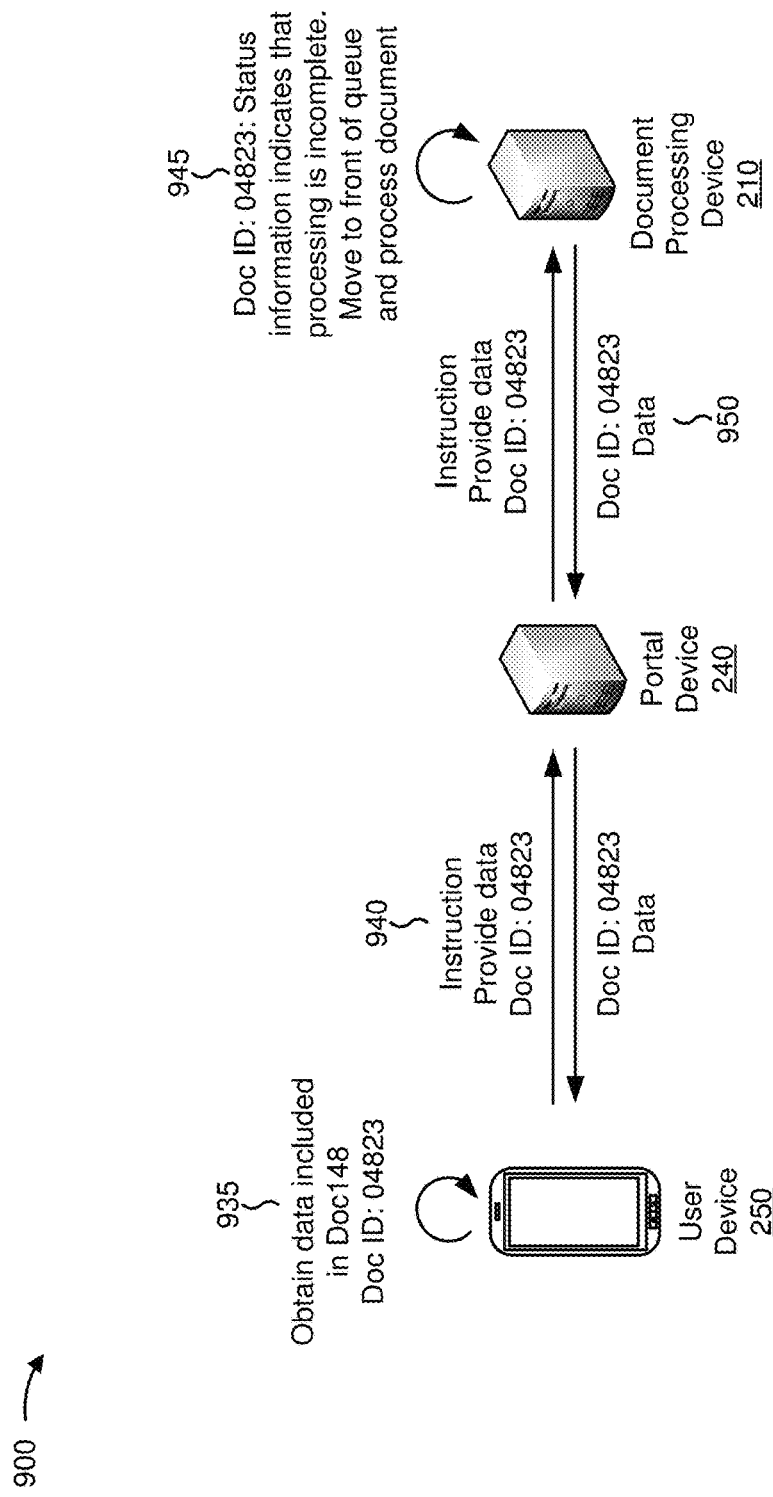

FIGS. 9A and 9B are diagrams of an example implementation 900 relating to example process 800 shown in FIG. 8. FIGS. 9A and 9B show an example of performing actions related to document processing based on receiving instructions. For the purpose of FIGS. 9A and 9B, assume that the operations described in connection with FIGS. 5, 7A, and 7B have been performed.

As shown in FIG. 9A, and by reference number 905, user device 250 may receive an interaction to cause user device 250 to determine a status of a particular document (e.g., Doc148, associated with a document identifier of 04823). As shown by reference number 910, to determine the status of the particular document, user device 250 may submit a status request to portal device 240. In some cases, user device 250 may submit the status request via a web application hosted by portal device 240. For example, portal device 240 may host a web application that provides an interface for obtaining status information, for providing instructions relating to document processing, for configuring a document processing operation, or the like. In some cases, user device 250 may host a middleware application (e.g., Oracle Fusion, etc.) that interacts with the interface provided by portal device 240. In this way, portal device 240 reduces processor usage associated with accessing document information by simplifying processes associated with accessing the document information.

As shown by reference number 915, portal device 240 may provide the status request to document processing device 210. As shown by reference number 920, based on the status request, document processing device 210 may determine a status of the particular document (e.g., "Validation complete. Queued at document processing device"). As shown by reference number 925, document processing device 210 may provide information identifying the status to portal device 240. As shown by reference number 930, portal device 240 may provide the information identifying the status to user device 250 (e.g., via a web application interface, etc.). In this way, document processing device 210 facilitates querying of document statuses as documents are processed.

As shown in FIG. 9B, and by reference number 935, user device 250 may receive an interaction to cause user device 250 to obtain data that is included in the particular document. As shown by reference number 940, user device 250 may provide an instruction to portal device 240 (e.g., via a web application interface of portal device 240). As further shown, the instruction may identify an action (e.g., to cause document processing device 210 to provide data associated with the particular document).

As shown by reference number 945, document processing device 210 may determine, based on status information associated with the particular document, that the particular document has not been processed. As further shown, based on receiving the instruction to provide the data included in the particular document, document processing device 210 may move the particular document to a first position in a queue (e.g., a queue of documents to be processed). As further shown, document processing device 210 may process the particular document to obtain the data. As shown by reference number 950, document processing device 210 may provide the data to user device 250 via portal device 240. In this way, document processing device 210 obtains data associated with the particular document based on the instruction and provides the data, which enables user device 250 to obtain document information as needed, thus conserving time that is otherwise used while waiting for document processing device 210 to process documents.

In this way, document processing device 210 generates, obtains, and/or modifies information based on instructions received from user device 250. By performing actions based on instructions from user device 250, document processing device 210 improves accuracy of the document processing process, permits user device 250 to obtain and/or modify processed documents, and enables a party associated with user device 250 to manage documents at each stage of the document processing process. Thus, document processing device 210 improves uniformity of the document processing process, reduces processor usage associated with redundant actions in the document processing process, and improves security of the documents and/or user device 250.

As indicated above, FIGS. 9A and 9B are provided merely as examples. Other examples are possible and may differ from what was described with regard to FIGS. 9A and 9B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   one or more devices to:
      receive a plurality of documents,
         the plurality of documents being received from multiple, different sources and being associated with multiple, different file formats;
      provide, to a machine learning model, at least one attribute associated with the plurality of documents,
         the at least one attribute including information identifying at least one of:
            the multiple, different sources, or
            the multiple, different file formats;
      receive, as output from the machine learning model, information identifying a plurality of operations to perform based on the at least one attribute;
      perform the plurality of operations on the plurality of documents to at least one of:
         prepare the plurality of documents for digital processing,
         obtain data included in the plurality of documents, or
         determine information describing the plurality of documents;
      store status information corresponding to the plurality of documents,
         the status information identifying results of performing the plurality of operations;
      receive an instruction pertaining to a document of the plurality of documents,
         the instruction identifying an action to perform with regard to the document;
      perform the action based on the instruction;
      update the status information, as updated status information, to identify the action or a result of performing the action; and
      provide the updated status information.

2. The system of claim 1, where the action includes obtaining particular data describing the document; and
   where the one or more devices, when performing the action, are to:
      determine that a particular operation to obtain the particular data has not been performed on the document;
      obtain the document;
      perform the particular operation to obtain the particular data; and
      cause the particular data to be provided via a web application.

3. The system of claim 1, where the plurality of operations include one or more of:
  an operation to determine whether a source or a destination of one or more of the plurality of documents is valid,
  an operation to perform an antivirus scan on one or more of the plurality of documents,
    an operation to decompress one or more of the plurality of documents, or
    an operation to determine whether a file format of one or more the plurality of documents are valid.

4. The system of claim 1, where the one or more devices, when receiving the plurality of documents, are to:
  receive the plurality of documents via a secure session.

5. The system of claim 1, where the one or more devices, when performing the plurality of operations, are to:
  perform an optical character recognition operation to identify the data included in the plurality of documents;
  generate a data structure based on the data included in the plurality of documents; and
  provide the data structure for storage in association with the plurality of documents.

6. The system of claim 1, where the one or more devices, when performing the plurality of operations, are to:
  provide a particular document, of the plurality of documents, to another device,
    the other device receiving input identifying the information relating to the plurality of documents; and
  receive, from the other device, the information relating to the plurality of documents.

7. The system of claim 1, where the at least one attribute associated with the plurality of documents includes at least one of:
  a file type attribute,
  a compression status attribute,
  a document source attribute,
  a document destination attribute,
  an encryption status attribute, or
  a file size attribute.

8. A non-transitory computer-readable medium storing instructions, the instructions comprising:
  one or more instructions that, when executed by one or more processors, cause the one or more processors to:
    receive a plurality of documents from multiple, different sources,
      the plurality of documents being associated with multiple, different file formats;
    provide, to a machine learning model, at least one attribute associated with the plurality of documents,
      the at least one attribute including information identifying at least one of:
        the multiple, different sources, or
        the multiple, different file formats;
    receive, as output from the machine learning model, information identifying a plurality of operations to perform based on the at least one attribute;
    perform the plurality of operations on the plurality of documents to at least one of:
      prepare the plurality of documents for digital processing,
      identify data included in the plurality of documents, or
      identify information relating to the plurality of documents;
    store status information corresponding to the plurality of documents,
      the status information for a document, of the plurality of documents, identifying a result of performing the plurality of operations with regard to the document;
    receive an instruction pertaining to a particular document of the plurality of documents,
      the instruction identifying an action to perform with regard to the particular document;
    perform the action based on the instruction;
    update the status information, as updated status information, to identify the action or a result of performing the action; and
    provide the updated status information.

9. The non-transitory computer-readable medium of claim 8, where the one or more instructions, that cause the one or more processors to perform the action, cause the one or more processors to:
  provide, for storage, the plurality of documents, the data included in the plurality of documents, or the information relating to the plurality of documents.

10. The non-transitory computer-readable medium of claim 9, where the action relates to obtaining one or more documents of the plurality of documents; and
  where the one or more instructions, that cause the one or more processors to perform the action, cause the one or more processors to:
    obtain, from storage, the one or more documents;
    obtain, from storage, data included in the one or more documents or information relating to the one or more documents; and
    provide the one or more documents, the data included in the one or more documents, or the information relating to the one or more documents.

11. The non-transitory computer-readable medium of claim 8, where the one or more instructions, that cause the one or more processors to provide the updated status information, cause the one or more processors to:
  provide the updated status information via a web application interface.

12. The non-transitory computer-readable medium of claim 8, where the action relates to performing a particular operation,
  the particular operation being different than the plurality of operations; and
  where the one or more instructions, that cause the one or more processors to perform the action, cause the one or more processors to:
    determine that the particular operation has not yet been performed with regard to the particular document; and
    perform the particular operation based on determining that the particular operation has not yet been performed.

13. The non-transitory computer-readable medium of claim 8, where an operation, of the plurality of operations, is an optical character recognition operation; and
  where the one or more instructions, that cause the one or more processors to receive the plurality of documents, cause the one or more processors to:
    receive information identifying a plurality of document templates corresponding to the plurality of documents,
      a document template, of the plurality of document templates, identifying one or more locations in a corresponding document at which to detect particular text; and perform the optical character recognition operation based on the plurality of document templates.

14. The non-transitory computer-readable medium of claim 8, where the one or more instructions, that cause the one or more processors to receive the instruction, cause the one or more processors to:

receive the instruction from a mobile device and based on an interaction with an interface of a web application; and where the one or more instructions, when executed by the one or more processors, cause the one or more processors to:

provide information identifying a result of the action to the mobile device via the web application.

15. A method, comprising:

receiving, by a device and from multiple, different sources, a plurality of documents,
the plurality of documents being received in multiple, different file formats;

providing, by the device and to a machine learning model, at least one attribute associated with the plurality of documents,
the at least one attribute including information identifying at least one of:
the multiple, different sources, or
the multiple, different file formats;

receiving, by the device and as output from the machine learning model, information identifying a plurality of operations to perform based on the at least one attribute;

performing, by the device, the plurality of operations on the plurality of documents to at least one of:
prepare the plurality of documents for digital processing,
obtain data included in the plurality of documents, or
determine information describing the plurality of documents;

storing or providing for storage, by the device, status information corresponding to the plurality of documents,
the status information for a document, of the plurality of documents, identifying results of performing the plurality of operations with regard to the document;

receiving, by the device, an instruction that identifies an action to perform with regard to the document of the plurality of documents;

performing, by the device and based on the instruction, the action;

updating, by the device, the status information to generate updated status information based on a result of performing the action; and providing, by the device, the updated status information.

16. The method of claim 15, further comprising:

generating a plurality of document identifiers corresponding to the plurality of documents; and where performing the action comprises:

determining that the action relates to the document based on the instruction including a document identifier corresponding to the document; and performing the action with regard to the document.

17. The method of claim 15, where the action includes one or more of:

obtaining and providing one or more of the plurality of documents, performing an optical character recognition operation on one or more of the plurality of documents, changing the information describing one or more of the plurality of documents, changing the data obtained from one or more of the plurality of documents, storing additional information in association with one or more of the plurality of documents, changing a position in a queue of one or more of the plurality of documents, deleting one or more of the plurality of documents from storage, moving one or more of the plurality of documents from a first storage location to a second storage location, obtaining and providing the data, or obtaining and providing the information describing one or more of the plurality of documents.

18. The method of claim 15, where receiving the plurality of documents comprises:

establishing, with another device, a secure session based on one or more credentials provided by the other device; and receiving the plurality of documents via the secure session.

19. The method of claim 15, where performing the plurality of operations comprises:

determining whether a particular document, of the plurality of documents, is associated with a particular file format; and selectively converting to the particular file format, or retaining in an unconverted state, the particular document, based on whether the particular document is associated with the particular file format,
the particular document being converted when the particular document is not associated with the particular file format; and
the particular document being retained in the unconverted state when the particular document is associated with the particular file format.

20. The method of claim 15, further comprising:

storing the plurality of documents;

receiving a request for a particular document of the plurality of documents;

determining that data included in the particular document has not been obtained;

obtaining the data included in the particular document; and providing the particular document and the data included in the particular document.

* * * * *